US010606359B2

(12) United States Patent
Levesque et al.

(10) Patent No.: US 10,606,359 B2
(45) Date of Patent: *Mar. 31, 2020

(54) SYSTEMS AND METHODS FOR HAPTICALLY-ENABLED INTERACTIONS WITH OBJECTS

(71) Applicant: Immersion Corporation, San Jose, CA (US)

(72) Inventors: Vincent Levesque, Montreal (CA); Wei Zhu, Verdun (CA); Eric Gervais, Montreal (CA); Fengtian An, Montreal (CA); Eric Lajeunesse, Saint-Hubert (CA); Johnny Maalouf, Montreal (CA)

(73) Assignee: Immersion Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/245,368

(22) Filed: Jan. 11, 2019

(65) Prior Publication Data

US 2019/0146588 A1    May 16, 2019

Related U.S. Application Data

(63) Continuation of application No. 15/490,253, filed on Apr. 18, 2017, now Pat. No. 10,216,280, which is a
(Continued)

(51) Int. Cl.
*H04B 3/36* (2006.01)
*G06F 3/01* (2006.01)
(Continued)

(52) U.S. Cl.
CPC ............. *G06F 3/016* (2013.01); *G06F 3/011* (2013.01); *G06F 3/014* (2013.01); *G06F 3/0338* (2013.01); *G06F 3/0425* (2013.01); *G08B 6/00* (2013.01)

(58) Field of Classification Search
CPC ............................. G06F 3/016; G06T 19/006
(Continued)

(56) References Cited

U.S. PATENT DOCUMENTS

| 6,115,482 A | 9/2000 | Sears et al. |
|---|---|---|
| 6,318,636 B1 | 11/2001 | Reynolds et al. |

(Continued)

FOREIGN PATENT DOCUMENTS

| CN | 101384047 A | 3/2009 |
|---|---|---|
| CN | 102099766 A | 6/2011 |

(Continued)

OTHER PUBLICATIONS

Bau et al., Revel: Tactile feedback technology for augmented reality, ACM Trans. Graph. 31(4), Article 89 (Jul. 2012), 11 pages.
(Continued)

*Primary Examiner* — Toan N Pham
(74) *Attorney, Agent, or Firm* — Kilpatrick Townsend & Stockton LLP

(57) ABSTRACT

One illustrative computing device disclosed herein includes a sensor configured to detect a user interaction with a physical object and transmit a sensor signal associated with the user interaction. The illustrative computing device also includes a processor in communication with the sensor, the processor configured to: receive the sensor signal; determine a characteristic of the physical object based on the sensor signal; and determine a function based at least in part on the user interaction and the characteristic. The processor is also configured to determine a haptic effect associated with the function; and transmit a haptic signal associated with the haptic effect. The illustrative computing device further includes a haptic output device in communication with the processor, the haptic output device configured to receive the haptic signal and output the haptic effect.

27 Claims, 7 Drawing Sheets

Related U.S. Application Data continuation of application No. 14/577,565, filed on Dec. 19, 2014, now Pat. No. 9,658,693.

(51) Int. Cl.
  *G06F 3/0338* (2013.01)
  *G06F 3/042* (2006.01)
  *G08B 6/00* (2006.01)

(58) Field of Classification Search
  USPC .................. 340/407.4, 4.12, 7.6; 345/173
  See application file for complete search history.

(56) References Cited

U.S. PATENT DOCUMENTS

| | | |
|---|---|---|
| 6,477,448 B1 | 11/2002 | Maruyama |
| 7,152,789 B2 | 12/2006 | Hasegawa et al. |
| 8,462,125 B2 | 6/2013 | Birnbaum et al. |
| 9,064,385 B2 | 6/2015 | Saboune et al. |
| 9,330,544 B2 | 5/2016 | Levesque et al. |
| 9,513,704 B2 | 12/2016 | Heubel et al. |
| 9,600,076 B2 | 3/2017 | Levesque et al. |
| 9,658,693 B2 | 5/2017 | Levesque et al. |
| 9,990,041 B2 | 6/2018 | Levesque et al. |
| 10,191,616 B2 | 1/2019 | Choi et al. |
| 10,216,280 B2 | 2/2019 | Levesque et al. |
| 2004/0108995 A1 | 6/2004 | Hoshino et al. |
| 2009/0051509 A1 | 2/2009 | Hwang |
| 2009/0270045 A1 | 10/2009 | Flaherty |
| 2011/0021272 A1 | 1/2011 | Grant et al. |
| 2012/0028577 A1 | 2/2012 | Rodriguez et al. |
| 2012/0176305 A1 | 7/2012 | Ryu et al. |
| 2013/0016042 A1 | 1/2013 | Makinen et al. |
| 2013/0024819 A1 | 1/2013 | Rieffel et al. |
| 2013/0100044 A1 | 4/2013 | Zhao et al. |
| 2013/0314303 A1 | 12/2013 | Osterhout et al. |
| 2014/0056461 A1 | 2/2014 | Afshar |
| 2014/0139451 A1 | 5/2014 | Levesque et al. |
| 2014/0180582 A1 | 6/2014 | Pontarelli et al. |
| 2014/0198034 A1 | 7/2014 | Bailey et al. |
| 2014/0256438 A1 | 9/2014 | Grant et al. |
| 2014/0266647 A1 | 9/2014 | Vistacion et al. |
| 2014/0320393 A1 | 10/2014 | Modarres et al. |
| 2014/0320431 A1 | 10/2014 | Cruz-Hernandez et al. |
| 2014/0361988 A1 | 12/2014 | Katz et al. |
| 2014/0362014 A1 | 12/2014 | Ullrich et al. |
| 2015/0323993 A1 | 11/2015 | Levesque et al. |
| 2016/0179198 A1 | 6/2016 | Levesque et al. |
| 2016/0179199 A1 | 6/2016 | Levesque et al. |
| 2017/0242488 A1 | 8/2017 | Levesque et al. |
| 2017/0269689 A1 | 9/2017 | Levesque et al. |

FOREIGN PATENT DOCUMENTS

| | | |
|---|---|---|
| CN | 103797441 A | 5/2014 |
| CN | 103838423 A | 6/2014 |
| CN | 103890689 A | 6/2014 |
| CN | 104024987 A | 9/2014 |
| CN | 104049739 A | 9/2014 |
| CN | 104049749 A | 9/2014 |
| CN | 105718044 | 6/2016 |
| CN | 105718045 | 6/2016 |
| EP | 3035162 | 6/2016 |
| EP | 3035163 | 6/2016 |
| JP | 2000-047566 A | 2/2000 |
| JP | 2002-347937 A | 12/2002 |
| JP | 2003-256705 A | 9/2003 |
| JP | 2004-133746 A | 4/2004 |
| JP | 2005-292909 A | 10/2005 |
| JP | 2006-126945 A | 5/2006 |
| JP | 2008-027330 A | 2/2008 |
| JP | 2008-510184 A | 4/2008 |
| JP | 2009-276996 A | 11/2009 |
| JP | 2011-103045 A | 5/2011 |
| JP | 2011-186985 A | 9/2011 |
| JP | 2012-146303 A | 8/2012 |
| JP | 2013-025789 A | 2/2013 |
| JP | 2014-194767 A | 10/2014 |
| JP | 2014-197388 A | 10/2014 |
| JP | 2014-199671 A | 10/2014 |
| JP | 2014-216025 A | 11/2014 |
| JP | 2014-531662 A | 11/2014 |
| JP | 2016119092 | 6/2016 |
| JP | 2016122445 | 7/2016 |
| KR | 10-2014-0019630 A | 2/2014 |
| WO | 2006/020637 A1 | 2/2006 |

OTHER PUBLICATIONS

Harrison, C. et al., TapSense: Enhancing finger interaction on touch surfaces, In the Proceedings of the 24$^{th}$ Annual ACM Symposium on User Interface Software and Technology, UIST'II. ACM, New York, 2011, 627-636.

Revel: programming the sense of touch, Disney Research Science at Play, web page at—http://www.disneyresearch.com/project/revel-progiamming:the-sense-of-touch/, as available via the Internet, 2012.

Sato, M. et al., Touche: Enhancing touch interaction on humans, screens, liquids, and everyday objects, CHI'12, May 5-10, 2012, 10 pages.

TapSense: enhancing finger interaction on touch surfaces, web page at http://www.chrisharrison.net/index.php/Research/TapSertse, as available via the Internet, 2011.

Touche: touch and gesture sensing for the real world, Disney Research Science at Play, web page at http://www.disneyresearch.com/project/touche-touch-and-gesture-sensing-for-the-real-world/, as available via the Internet, 2012.

European Patent Office, Extended European Search Report, Application No. 15200963 dated May 3, 2016.

European Patent Office, Extended European Search Report, Application No. 15200964 dated Apr. 25, 2016.

European Patent Office Application 15 200 964.3, Communication Pursuant to Article 94(3) EPC dated Jan. 3, 2018, 6 pages.

United States Patent and Trademark Office, Office Action, U.S. Appl. No. 14/577,461 dated May 19, 2016.

U.S. Appl. No. 15/424,987, Non-Final Office Action dated Aug. 11, 2017.

U.S. Appl. No. 15/490,253, Non-Final Office Action dated Mar. 19, 2018.

U.S. Appl. No.14/577,565 , "Non-Final Office Action", dated Jun. 1, 2016, 10 pages.

U.S. Appl. No. 15/970,263 , "Non Final Office Action", dated Oct. 2, 2018, 6 pages.

European Application EP15200963.5 , "Examiner Report", dated Dec. 17, 2018, 5 pgs.

European Application EP15200964.3 , "Office Action", dated Feb. 13, 2019, 6 pages.

CN 201510963960.2, "Office Action," dated Aug. 27, 2019, 7 pages.

CN 201510964445.6, "Office Action," dated Aug. 16, 2019, 17 pages.

JP 2015-246993, "Office Action," dated Jul. 23, 2019, 9 pages.

EP 15200963.5, "Office Action," dated Sep. 19, 2019, 4 pages.

JP 2015-247068, "Office Action," dated Nov. 12, 2019, 4 pages.

SYSTEMS AND METHODS FOR HAPTICALLY-ENABLED INTERACTIONS WITH OBJECTS

CROSS REFERENCE TO RELATED APPLICATIONS

This application is a continuation of and claims priority to U.S. patent application Ser. No. 15/490,253, filed Apr. 18, 2017 and entitled "Systems and Methods for Haptically-Enabled Interactions with Objects," now U.S. Pat. No. 10,216,280 issued on Feb. 26, 2019, which is a continuation of U.S. patent application Ser. No. 14/577,565, filed Dec. 19, 2014 and entitled "Systems and Methods for Haptically-Enabled Interactions with Objections," now U.S. Pat. No. 9,658,693 issued on May 23, 2017, and is related to U.S. patent application Ser. No. 14/577,461, filed Dec. 19, 2014 and entitled "Systems and Methods for Object Manipulation with Haptic Feedback," now U.S. Pat. No. 9,600,076 issued on Mar. 21, 2017, the entirety of each of which is hereby incorporated by reference herein.

FIELD OF THE INVENTION

The present invention relates to the field of user interface devices. More specifically, the present invention relates to haptically-enabled interactions with objects.

BACKGROUND

Humans are increasingly using computer-based systems to perform digital tasks associated with products. For example, consumers may use mobile devices (e.g., smartphones) to read reviews about a product, purchase a product, or add a product to a shopping list. It may be difficult and time consuming, however, for a user to perform such digital tasks. For example, the user may need to interact with the small user interface (e.g., touchscreen display) of a mobile device to complete an online purchase. Some digital tasks require multiple complicated steps that can be frustrating for a user. Thus, there is a need for an improved user interface that can allow users to perform such digital tasks quickly and easily. It may be desirable to use haptic feedback (e.g., mechanical vibrations) to improve such user interfaces.

SUMMARY

Embodiments of the present disclosure comprise haptically-enabled interactions with objects. In one embodiment, a computing device of the present disclosure may comprise: a sensor configured to detect a user interaction with a physical object and transmit a sensor signal associated with the user interaction. The computing device may also comprise a processor in communication with the sensor, the processor configured to: receive the sensor signal; determine a characteristic of the physical object based on the sensor signal; and determine a function based at least in part on the user interaction and the characteristic. The processor may also be configured to determine a haptic effect associated with the function; and transmit a haptic signal associated with the haptic effect. The computing device may further include a haptic output device in communication with the processor, the haptic output device configured to receive the haptic signal and output the haptic effect.

In another embodiment, a method of the present disclosure may comprise: receiving a sensor signal from a sensor, where the sensor signal is associated with a user interaction with a physical object. The method may also comprise determining a characteristic of the physical object based on the sensor signal, and determining a function based at least in part on the user interaction and the characteristic. The method may further comprise determining a haptic effect associated with the function, and transmitting a haptic signal associated with the haptic effect. A haptic output device may be configured to receive the haptic signal and output the haptic effect. Yet another embodiment comprises a computer-readable medium for implementing such a method.

These illustrative embodiments are mentioned not to limit or define the limits of the present subject matter, but to provide examples to aid understanding thereof. Further embodiments are discussed in the Detailed Description, and additional description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Figure 1:
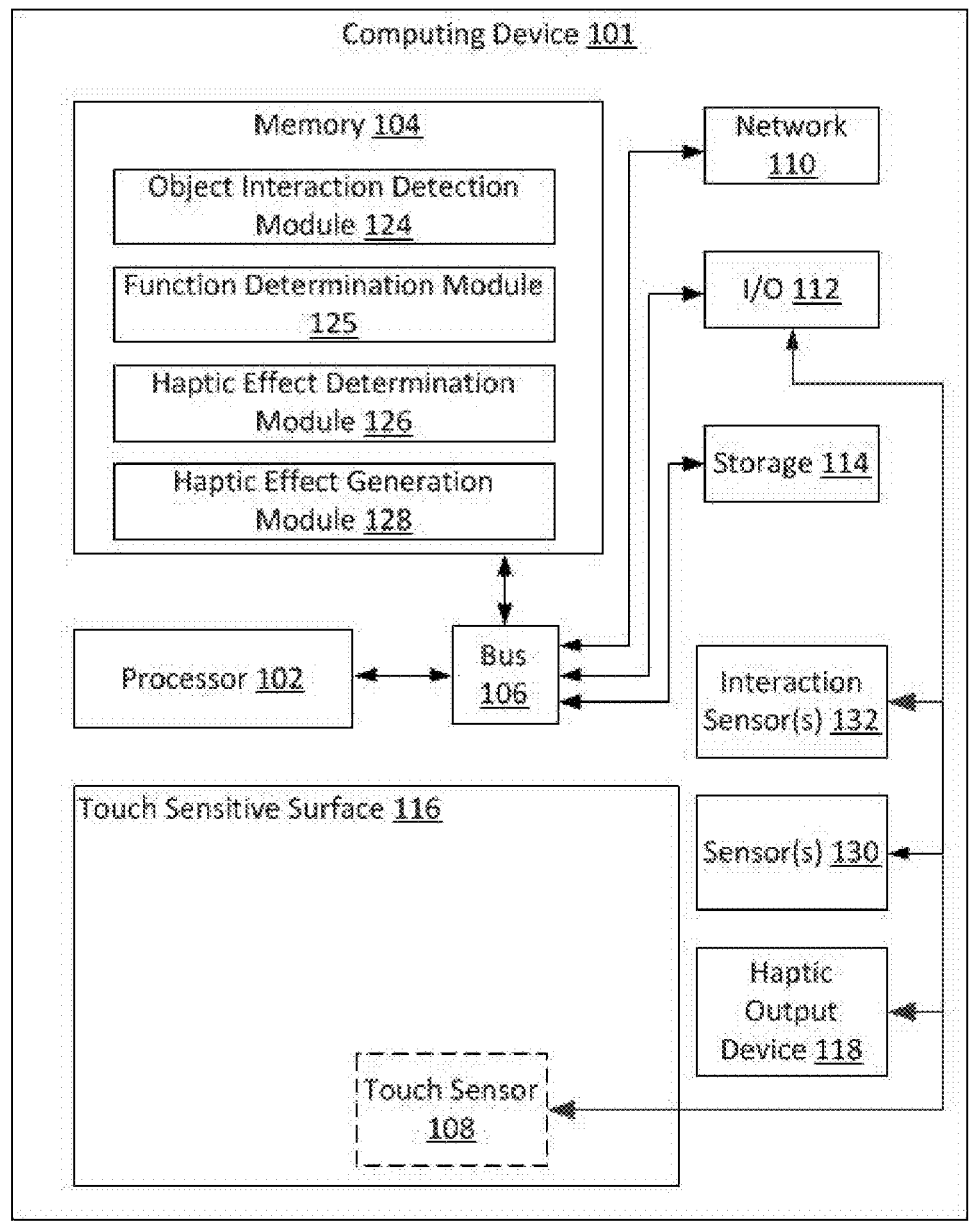
FIG. 1 is a block diagram showing a system for haptically-enabled interactions with objects according to one embodiment.

Reference will now be made in detail to various and alternative illustrative embodiments and to the accompanying drawings. Each example is provided by way of explanation, and not as a limitation. It will be apparent to those skilled in the art that modifications and variations can be made. For instance, features illustrated or described as part of one embodiment may be used in another embodiment to yield a still further embodiment. Thus, it is intended that this disclosure include modifications and variations that come within the scope of the appended claims and their equivalents.

Illustrative Examples of Haptically-Enabled Interactions with Objects

One illustrative embodiment of the present disclosure comprises a computing device. The computing device comprises a processor coupled to a memory via a bus. In the illustrative embodiment, the computing device is configured to be worn by the user. For example, the computing device may comprise a ring configured to be worn on a user's finger.

In the illustrative embodiment, the computing device comprises a sensor configured to detect a user interaction with an object and transmit sensor signals to the processor. An object, as used herein, is anything (e.g., real or virtual) with which a user can potentially interact. For example, a user may pick up a 9 v battery from a drawer. The user may make an "L" shaped gesture in the air whole holding the 9 v battery. In the illustrative embodiment, the computing device may detect the user's interaction with the 9 v battery. The computing device may determine that the user interaction comprises an "L" shaped gesture, and that the object comprises a 9 v battery. In the illustrative embodiment, the computing device determines, based at least in part on the user interaction and the object, a function to perform. A function, as used herein, comprises one or more digital operations. The computing device may then execute the function. For example, based on the "L" shaped gesture and the 9 v battery, the computing device may determine a function comprising adding 9 v batteries to the user's shopping list. The computing device may then add 9 v batteries to the user's shopping list (e.g., on a shopping mobile application). In this manner, the user can quickly and easily perform functions in the digital world by interacting with objects in real space.

In the illustrative embodiment, the computing device further comprises a haptic output device. The computing device may provide haptic feedback to a user based on the user interaction, object, and/or function. For example, in the illustrative embodiment, the computing device outputs a haptic effect comprising a short vibration to confirm the function has been performed (e.g., upon 9 v batteries being added to the user's shopping list). This may notify the user that the function has been performed.

The description of the illustrative embodiment above is provided merely as an example. Various other embodiments of the present invention are described herein and variations of such embodiments would be understood by one of skill in the art. Advantages offered by various embodiments may be further understood by examining this specification and/or by practicing one or more embodiments of the claimed subject matter.

Illustrative Systems for Haptically-Enabled Interactions with Objects

FIG. 1 is a block diagram showing a computing device 101 for haptically-enabled interactions with objects according to one embodiment. In some embodiments, the computing device 101 may comprise a graspable device (e.g., a smartphone, tablet, e-reader, and/or a portable gaming device). In other embodiments, the computing device 101 may comprise a wearable device (e.g., a ring, a shoe, an armband, a sleeve, a jacket, glasses, a glove, a watch, a wristband, a bracelet, an article of clothing, a hat, a headband, and/or jewelry).

In some embodiments, the components (e.g., the processor 202, network 110, interaction sensor 132, sensor 130, etc.) of the computing device 101 may be integrated into a single housing. In other embodiments, the components may be distributed (e.g., among multiple housings or locations) and in electrical communication with one another. The computing device 101 may or may not comprise all of the components depicted in FIG. 1. For example, in some embodiments, the computing device 101 may comprise the processor 102, bus 106, memory 104, network 110, and haptic output device 118.

The computing device 101 comprises a processor 102 interfaced with other hardware via bus 106. A memory 104, which can comprise any suitable tangible (and non-transitory) computer-readable medium such as RAM, ROM, EEPROM, or the like, may embody program components that configure operation of the computing device 101. In some embodiments, the computing device 101 may further comprise one or more network interface devices 110, input/output (I/O) interface components 112, and additional storage 114.

Network interface device 110 can represent one or more of any components that facilitate a network connection or otherwise facilitate communication between electronic devices. Examples include, but are not limited to, wired interfaces such as Ethernet, USB, IEEE 1394, and/or wireless interfaces such as IEEE 802.11, Bluetooth, near-field communication (NFC) interfaces, RFID interfaces, or radio interfaces for accessing cellular telephone networks (e.g., transceiver/antenna for accessing a CDMA, GSM, UMTS, or other mobile communications network).

I/O components 112 may be used to facilitate connection to devices such as one or more displays, touch sensitive surfaces 116, keyboards, mice, speakers, microphones, buttons, and/or other hardware used to input data or output data. Storage 114 represents nonvolatile storage such as read-only memory, flash memory, ferroelectric RAM (F-RAM), magnetic, optical, or other storage media included in the computing device 101 or coupled to processor 102.

The computing device 101 may comprise a touch sensitive surface 116. Touch sensitive surface 116 represents any surface that is configured to sense tactile input of a user. One or more touch sensors 108 are configured to detect a touch in a touch area (e.g., when an object contacts a touch sensitive surface 116) and transmit signals associated with the touch to processor 102. Any suitable number, type, or arrangement of touch sensors 108 can be used. For example, resistive and/or capacitive sensors may be embedded in touch sensitive surface 116 and used to determine the location of a touch and other information, such as pressure, speed, and/or direction. As another example, optical sensors with a view of the touch sensitive surface 116 may be used to determine the touch position. As still another example, the touch sensitive surface 116 may comprise a LED (Light Emitting Diode) finger detector mounted on the side of a display. In some embodiments, touch sensor 108 may be configured to detect multiple aspects of the user interaction. For example, touch sensor 108 may detect both the speed and pressure of a user interaction, and incorporate this information into the signal transmitted to the processor 102.

In some embodiments, the computing device 101 comprises a touch-enabled display that combines a touch sensitive surface 116 and a display of the device. The touch sensitive surface 116 may correspond to the display exterior or one or more layers of material above components of the display. In other embodiments, touch sensitive surface 116 may not comprise (or otherwise correspond to) a display, depending on the particular configuration of the computing device 101.

In some embodiments, the computing device 101 comprises an interaction sensor 132. The interaction sensor 132 is configured to detect an interaction with the computing device 101 and/or an object (e.g., a product on a shelf in a store) by a user (e.g., using a finger, foot, hand, arm, head, leg, or other body part). In some embodiments, the user interaction may comprise touching the object, gesturing in real space, gesturing using the object (e.g., picking up the object and moving it in real space), or gesturing on an object (e.g., swiping a finger along a surface of the object). The interaction sensor 132 is further configured to transmit a sensor signal associated with the interaction to processor 102. The interaction sensor 132 may comprise an accelerometer, gyroscope, camera, radio frequency identification (RFID) tag or reader, indoor proximity system, NFC communication device, global positioning system (GPS) device, magnetometer, ultrasonic transducer, switch, button, optical sensor, light sensor, microphone, wireless interface (e.g., an IEEE 802.11 or Bluetooth interface), infrared sensor, depth sensor, and/or range sensor.

For example, in one embodiment, the interaction sensor 132 comprises a wireless interface that is configured to detect the strength of a wireless signal emitted by an object. The interaction sensor 132 may transmit a sensor signal associated with the wireless signal strength to the processor 102. Based on the wireless signal strength, the processor 102 may determine, for example, whether the computing device 101 is within a predefined distance of the object. If so, the processor 102 may determine an interaction (e.g., coming within a predefined distance of the object) occurred.

In another embodiment, the interaction sensor 132 comprises a microphone positioned to detect sounds associated with the manipulation of an object. For instance, a user may shake a tin of coffee or a box of cereal. The interaction sensor 132 may detect sounds associated with the shake. The interaction sensor 132 may transmit sensor signals associated with the sounds to the processor 102. Based on the sensor signals, the processor 102 may determine, for example, that the object has moved or that a user interaction has otherwise occurred.

In still another embodiment, the interaction sensor 132 comprises a camera oriented toward an object. A user may make a gesture (e.g., a check mark sign) in the air (e.g., with a body part, such as a finger, hand, arm, foot, head, or leg) near the object. The interaction sensor 132 may capture images associated with the gesture and transmit sensor signals to the processor 102. Based on the sensor signals, the processor 102 may determine that a user interaction occurred. The processor 102 may further analyze the sensor signals to determine the specific type of gesture that occurred. For example, the processor 102 may analyze the sensor signals and determine that the user made a check mark in the air with a finger.

In yet another embodiment, the interaction sensor 132 comprises an optical sensor. An object may be positioned for blocking light from reaching the interaction sensor 132. For example, the object may sit on top of an interaction sensor 132 positioned in a shelf. Upon a user moving the object or manipulating the object, the interaction sensor 132 may detect a change in the amount of light. The interaction sensor 132 may transmit sensor signals associated with the change in the amount of light to the processor 102. Based on the sensor signals, the processor 102 may determine that a user interaction occurred, or a characteristic of the user interaction (e.g., if the user moved the object a distance that is above a threshold).

In some embodiments, the interaction sensor 132 is external to computing device 101 and in wired or wireless communication with the computing device 101. For example, the interaction sensor 132 may comprise a camera associated with a wearable device (e.g., glasses or a tie) and in communication with the computing device 101. As another example, the interaction sensor 132 may comprise a 3D imaging system (e.g., the 3D imaging system commonly sold under the trademark Microsoft Kinect®) or a LED-based tracking system positioned external to the computing device 101 (e.g., on a shelf in a store) and in communication with the computing device 101.

The computing device 101 may further comprise one or more additional sensor(s) 130. The sensor(s) 130 are configured to transmit sensor signals to the processor 102. In some embodiments, the sensor 130 may comprise, for example, a humidity sensor, ambient light sensor, gyroscope, GPS unit, accelerometer, range sensor, depth sensor, biosensor, camera, or temperature sensor. In some embodiments, the sensor 130 may be external to computing device 101 and in wired or wireless communication with the computing device 101. For example, the sensor 130 may comprise a biosensor coupled to a wearable device (e.g., a ring or wristband). The biosensor may be configured to wirelessly transmit sensor signals to the computing device 101, which may be, for example, positioned in the user's pocket.

In some embodiments, the computing device 101 comprises a haptic output device 118 in communication with processor 102. The haptic output device 118 is configured to output a haptic effect in response to a haptic signal. In some embodiments, the haptic output device 118 is configured to output a haptic effect comprising a vibration, a change in a perceived coefficient of friction, a simulated texture, a change in temperature, a stroking sensation, an electro-tactile effect, or a surface deformation (e.g., a deformation of a surface associated with the computing device 101). Further, some haptic effects may use multiple haptic output devices 118 of the same or different types in sequence and/or in concert. Although a single haptic output device 118 is shown in FIG. 1, embodiments may use multiple haptic output devices 118 of the same or different type to produce haptic effects.

In some embodiments, the haptic output device 118 is external to computing device 101 and in communication with the computing device 101 (e.g., via wired interfaces such as Ethernet, USB, IEEE 1394, and/or wireless interfaces such as IEEE 802.11, Bluetooth, or radio interfaces). For example, the haptic output device 118 may be associated with (e.g., coupled to) a wearable device and configured to receive haptic signals from the processor 102.

In some embodiments, the haptic output device 118 is configured to output a haptic effect comprising a vibration. The haptic output device 118 may comprise, for example, one or more of a piezoelectric actuator, an electric motor, an electro-magnetic actuator, a voice coil, a shape memory alloy, an electro-active polymer, a solenoid, an eccentric rotating mass motor (ERM), or a linear resonant actuator (LRA).

In some embodiments, the haptic output device 118 is configured to output a haptic effect modulating the perceived coefficient of friction of a surface associated with the haptic output device 118. In one embodiment, the haptic output device 118 comprises an ultrasonic actuator. An ultrasonic actuator may vibrate at an ultrasonic frequency, for example 20 kHz, increasing or reducing the perceived coefficient of an associated surface. In some embodiments, the ultrasonic actuator may comprise a piezo-electric material.

In some embodiments, the haptic output device 118 uses electrostatic attraction, for example by use of an electrostatic actuator, to output a haptic effect. The haptic effect may comprise a simulated texture, a simulated vibration, a stroking sensation, or a perceived change in a coefficient of friction on a surface associated with computing device 101. In some embodiments, the electrostatic actuator may comprise a conducting layer and an insulating layer. The conducting layer may be any semiconductor or other conductive material, such as copper, aluminum, gold, or silver. The insulating layer may be glass, plastic, polymer, or any other insulating material. Furthermore, the processor 102 may operate the electrostatic actuator by applying an electric signal, for example an AC signal, to the conducting layer. In some embodiments, a high-voltage amplifier may generate the AC signal. The electric signal may generate a capacitive coupling between the conducting layer and an object (e.g., a user's finger, head, foot, arm, shoulder, leg, or other body part, or a stylus) near or touching the haptic output device 118. Varying the levels of attraction between the object and the conducting layer can vary the haptic effect perceived by a user.

In other embodiments, the haptic output device 118 may use reverse electrovibration to generate a haptic effect. In such an embodiment, the haptic output device 118 may include a conductor contacting a body part of the user. The processor 102 may operate haptic output device 118 by applying an electric signal, for example an AC signal, to the user via the conductor. The electrical signal can generate an electrical field on the user's skin. If the user interacts with a physical object comprising a conductor covered by an insulator, an electrical potential difference between the user's body (e.g., due to the electrical field generated by the electrical signal) and the electrode may create an electrostatic attraction. Both the object and the user may be tied to a common electrical ground to generate the electrostatic attraction. In some embodiments, varying the properties of the electrical signal can cause the characteristics of the electrostatic attraction between the user and the physical object to change. In some embodiments, this can vary the haptic effect perceived by the user.

In some embodiments, the haptic output device 118 comprises a deformation device configured to output a deformation haptic effect. The deformation haptic effect may comprise raising or lowering portions of a surface associated with the computing device 101. For example, if the computing device 101 is positioned within a product (e.g., in a store), the deformation haptic effect may comprise raising portions of a surface of a product's packaging to generate a bumpy texture. In some embodiments, the deformation haptic effect may comprise bending, folding, rolling, twisting, squeezing, flexing, changing the shape of, or otherwise deforming a surface associated with the computing device 101. For example, the deformation haptic effect may apply a force on the computing device 101 or a surface associated with the computing device 101, causing it to bend, fold, roll, twist, squeeze, flex, change shape, or otherwise deform. For instance, if the computing device 101 is positioned within a product's packaging, the deformation haptic effect may comprise bending the top of a product's packaging toward a user. This may notify the user that a specific function has been performed (e.g., that the computing device 101 purchased the product via the Internet and the user is now free to take the product).

In some embodiments, the haptic output device 118 comprises fluid configured for outputting a deformation haptic effect (e.g., for bending or deforming the computing device 101 or a surface associated with the computing device 101). For example, the fluid may comprise a smart gel. A smart gel comprises a fluid with mechanical or structural properties that change in response to a stimulus or stimuli (e.g., an electric field, a magnetic field, temperature, ultraviolet light, shaking, or a pH variation). For instance, in response to a stimulus, a smart gel may change in stiffness, volume, transparency, and/or color. In some embodiments, stiffness may comprise the resistance of a surface associated with the computing device 101 against deformation. In some embodiments, one or more wires may be embedded in or coupled to the smart gel. As current runs through the wires, heat is emitted, causing the smart gel to expand or contract. This may cause the computing device 101 or a surface associated with the computing device 101 to deform.

As another example, the fluid may comprise a rheological (e.g., a magneto-rheological or electro-rheological) fluid. A rheological fluid comprises metal particles (e.g., iron particles) suspended in a fluid (e.g., oil or water). In response to an electric or magnetic field, the order of the molecules in the fluid may realign, changing the overall damping and/or viscosity of the fluid. This may cause the computing device 101 or a surface associated with the computing device 101 to deform.

In some embodiments, the haptic output device 118 comprises a mechanical deformation device. For example, in some embodiments, the haptic output device 118 may comprise an actuator coupled to an arm that rotates a deformation component. The deformation component may comprise, for example, an oval, starburst, or corrugated shape. The deformation component may be configured to move a surface associated with the computing device 101 at some rotation angles but not others. The actuator may comprise a piezo-electric actuator, rotating/linear actuator, solenoid, an electroactive polymer actuator, macro fiber composite (MFC) actuator, shape memory alloy (SMA) actuator, and/or other actuator. As the actuator rotates the deformation component, the deformation component may move the surface, causing it to deform. In such an embodiment, the deformation component may begin in a position in which the surface is flat. In response to receiving a signal from processor 102, the actuator may rotate the deformation component. Rotating the deformation component may cause one or more portions of the surface to raise or lower. The deformation component may, in some embodiments, remain in this rotated state until the processor 102 signals the actuator to rotate the deformation component back to its original position.

Further, other techniques or methods can be used to deform a surface associated with the computing device 101. For example, the haptic output device 118 may comprise a flexible surface layer configured to deform its surface or vary its texture based upon contact from a surface reconfigurable haptic substrate (including, but not limited to, e.g., fibers, nanotubes, electroactive polymers, piezoelectric elements, or shape memory alloys). In some embodiments, the haptic output device 118 is deformed, for example, with a deforming mechanism (e.g., a motor coupled to wires), air or fluid pockets, local deformation of materials, resonant mechanical elements, piezoelectric materials, micro-electromechanical systems ("MEMS") elements or pumps, thermal fluid pockets, variable porosity membranes, or laminar flow modulation.

In some embodiments, the haptic output device 118 is configured to remotely project haptic effects to a user. For example, the haptic output device 118 may comprise one or more jets configured to emit materials (e.g., solids, liquids, gasses, or plasmas) toward the user (e.g., toward the back of the user's hand). In one such embodiment, the haptic output device 118 comprises a gas jet configured to emit puffs or streams of oxygen, nitrogen, carbon dioxide, or carbon monoxide with varying characteristics upon receipt of the haptic signal. As another example, the haptic output device 118 may comprise one or more ultrasonic transducers or speakers configured to project pressure waves in the direction of the user. In one such embodiment, upon the user interacting with an object, the processor 102 may cause the haptic output device 118 to emit a concentrated pressure wave toward the user. The concentrated pressure wave may vibrate a portion of the user's body (e.g., the user's hand).

In some embodiments, the haptic output device 118 may be a portion of the housing of the computing device 101. In other embodiments, the haptic output device 118 may be housed inside a flexible housing overlaying a surface associated with the computing device 101 (e.g., the front or back of the computing device 101). For example, the computing device 101 may comprise a watch. The haptic output device 118 may comprise a layer of smart gel overlaying the interior of the band of the watch. Upon actuating the haptic output device 118 (e.g., with an electric current or an electric field), the smart gel may expand. This may cause the user to perceive a haptic effect comprising a squeezing sensation around the user's wrist.

Turning to memory 104, modules 124, 125, 126, and 128 are depicted to show how a device can be configured in some embodiments to provide haptically-enabled interactions with objects. In this example, the object interaction detection module 124 comprises code that configures the processor 102 to monitor the interaction sensor 132 and/or the additional sensors 130 to determine if a user has interacted with an object. The object interaction detection module 124 may comprise one or more algorithms or lookup tables useable by the processor 102 to determine whether a user is interacting with an object.

For example, the computing device 101 may be positioned within a product in a store. A user may, for example, lift the product off a shelf. The object interaction detection module 124 may comprise code that samples the sensor 130 (e.g., an accelerometer) to track the acceleration of the product. If the amount of acceleration exceeds a threshold, the object interaction detection module 124 may determine that the product is being manipulated (e.g., that the user has lifted the product).

As another example, the interaction sensor 132 may comprise a range sensor oriented toward an object. The object interaction detection module 124 may comprise code that configures the processor 102 to receive data from the range sensor. The object interaction detection module 124 may further comprise code that analyzes the data to determine whether the user is within a certain distance of the object, which may be indicative of a user interaction.

As still another example, the interaction sensor 132 may comprise a 3D imaging system oriented toward an object. In one embodiment, the object interaction detection module 124 may comprise code for analyzing images from a 3D imaging system to determine whether a user is interacting with an object. Further examples of methods for detecting user interactions with objects are described with respect to FIG. 9.

In some embodiments, the object may comprise a virtual object. The virtual object may be, for example, output on a touchscreen display comprising touch sensitive surface 116. The object interaction detection module 124 may comprise code that configures the processor 102 to detect a user interaction with the virtual object. For instance, a user may tap on a location on the touch sensitive surface 116 associated with the virtual object. The object interaction detection module 124 may receive one or more sensor signals associated with the user interaction from the touch sensor 108. In some embodiments, the sensor signals may incorporate the location, pressure, direction, and/or speed of the user interaction. The object interaction detection module 124 may determine one or more characteristics of the user interaction based on the sensor signal.

As another example, the virtual object may be part of an augmented reality environment output via, for instance, a touchscreen display, goggles, glasses, or contact lenses. The augmented reality environment may comprise camera data that has been supplemented ("augmented") with virtual content, such as text or images. For example, the interaction sensor 132 may comprise a camera. In some embodiments, the interaction sensor 132 may capture images of the user's living room, which the processor 102 may use to generate the augmented reality environment. The processor 102 may further generate one or more virtual objects within the augmented reality environment. For example, the processor 102 may include a virtual couch in the augmented reality environment. In some embodiments, a user may interact with the virtual object, for example, by touching or gesturing in an area in real space associated with the virtual object. The object interaction detection module 124 may determine one or more characteristics of the user interaction, for example, by analyzing images from the interaction sensor 132.

In some embodiments, the object interaction detection module 124 comprises code that determines a characteristic (e.g., an amount of pressure, speed, direction, location, type of gesture) associated with the interaction. The object interaction detection module 124 may comprise code that analyzes sensor signals from the sensor 130 and/or interaction sensor 132 to determine the characteristic. For example, the object interaction detection module 124 may comprise code for analyzing images from a 3D imaging system to determine a type of gesture (e.g., swipe, two-finger pinch, shake, etc.) made by the user.

In some embodiments, the object interaction detection module 124 comprises code that determines a characteristic associated with the interaction using swept frequency capacitive sensing. Swept frequency capacitive sensing may comprise measuring the change in the capacitance of an object (e.g., in voltage) at a plurality of frequencies as a user interacts with the object. The object interaction detection module 124 may generate a profile of the user interaction based on the changed capacitances at the plurality of frequencies. In some embodiments, the object interaction detection module 124 may compare the profile to predetermined interaction profiles. In some embodiments, each predetermined interaction profile may comprise a unique distribution of changes in capacitance at the plurality of frequencies and may be associated with a different user interaction (e.g., a two finger pinch, a full hand grasp, or a single finger tap). For instance, a predetermined interaction profile associated with a two finger pinch may be different than a predetermined interaction profile associated with a full hand grasp. In this manner, the object interaction detection module 124 may be able to determine specifically how the user may be interacting with the object.

In some embodiments, the object interaction detection module 124 comprises code that determines a characteristic associated with the interaction based on sound signals from the interaction sensor 132. For example, the interaction sensor 132 may comprise a microphone. The object interaction detection module 124 may receive sensor signals from the interaction sensor 132 and compare data from the sensor signals with one or more sound profiles. In some embodiments, each sound profile may comprise sound data that is associated with a different user interaction, for example, a user touching an object with a finger, a knuckle, a finger nail, or a palm. For instance, a sound profile associated with a finger contacting an object may comprise a different frequency response than a sound profile associated with a knuckle contacting the object. In this manner, the object interaction detection module 124 may be able to determine with which body part the user may be interacting with the object.

In some embodiments, the object interaction detection module 124 comprises code that determines a characteristic associated with the object. The object may comprise a product in a store (e.g., a box of cereal), a tool (e.g., a hammer or screw driver), a medical device (e.g., a trocar, needle, or heartbeat monitor), an automobile, a human, an animal, etc. The characteristic may comprise information about the object. For example, depending on the type of object, the characteristic may comprise a nutritional fact (if the object is a food product), size, weight, depth, color, texture, shape, dimension, price, discount, product rating (e.g., a grade or another comparative metric, such as a "star rating"), expiration date, function or utility (e.g., what function the object performs or may be used for), available quantity or whether the object is in stock, restriction on use, warranty, brand, manufacturer, producer, place of production, amount of power consumption or other electrical characteristic, an amount of noise, a mechanical characteristic, top speed, average speed, material (e.g., whether the object is made of wood, glass, ceramic, plastic, and/or metal), and/or compatibility information (e.g., what devices with which the object is compatible) associated with the object.

In some embodiments, the object interaction detection module 124 may determine the characteristic based at least in part on information provided by the user or a third party. For example, a user may input into the computing device 101 data about one or more electronic devices (e.g., a TV and a video game system) that the user owns or desires. In such an embodiment, the object interaction detection module 124 may consult the data to determine if the object (e.g., a remote control) is compatible with at least one of the electronic devices. Thus, in such an embodiment, the characteristic may comprise whether the object is compatible with an electronic device owned or desired by the user.

In one embodiment, the object interaction detection module 124 may comprise code that analyzes data from the interaction sensor 132 and/or additional sensors 130 to determine the characteristic associated with the object. For example, object interaction detection module 124 may comprise code that receives images of the object from a camera and applies Optical Character Recognition (OCR) to determine the contents of text associated with the object. As another example, the object interaction detection module 124 may comprise code that analyzes images from the interaction sensor 132 to determine a height, width, color, size, shape, pattern, texture, name, type, QR code, barcode, label, logo, color scheme, shape, and/or another characteristic of the object.

In some embodiments, the object interaction detection module 124 comprises code that analyzes data received via the network interface device 110 to determine a characteristic of the object. For example, the object may transmit a signal to the computing device 101 using Bluetooth, IEEE 802.11, RFID, or NFC. The signal may comprise a characteristic of the object (e.g., the signal may comprise a name, type, brand, barcode, price, RFID code, or electrical characteristic). The object interaction detection module 124 may analyze parameters of the signal to determine the characteristic of the object.

In some embodiments, the object interaction detection module 124 comprises code that determines a characteristic associated with the object using the Internet or another network (e.g., a LAN). For example, the object interaction detection module 124 may comprise code for retrieving the name of a sports team (e.g., a baseball team) associated with an object (e.g., a baseball bat, helmet, or jersey) by communicating with one or more servers or webpages via the Internet. As another example, the object interaction detection module 124 may comprise code for retrieving nutritional information associated with a food product in a store by communicating with a server associated with the store (e.g., the store's local server).

The object interaction detection module 124 may comprise code that identifies the object based on the characteristic. For example, if the object is a book, the object interaction detection module 124 may comprise code that analyzes text associated with the book, a barcode, and/or a QR code to determine the name of the book. As another example, if the object is a car, the object interaction detection module 124 may comprise code that analyzes images from a camera to determine the make, model, and/or year of the car.

Function determination module 125 comprises code that configures the processor 102 to determine a function to execute. The function determination module 125 may comprise code that selects one or more functions to execute using one or more algorithms or lookup tables. In some embodiments, a function may comprise purchasing an object (e.g., via the Internet), opening a webpage, initiating printing of a document, opening a driving direction application, sending an e-mail or text message, determining information about the object (e.g., by querying one or more servers), setting a virtual alarm clock, setting a parameter of a navigation application (e.g., setting a starting point or destination location), calling a phone number, copying text from a document, taking a picture, saving data, selecting a program option or setting, recording a sound, adding an entry to a list, removing an entry from a list, outputting a sound, playing media content, opening an e-book, performing a calculation, sending data, and/or receiving data. The function determination module 125 may also comprise code for executing the function.

In some embodiments, the function determination module 125 comprises code for determining a function based on a characteristic of the user interaction and a characteristic of the object. For example, the function determination module 125 may comprise a lookup table that maps specific user interactions (or general types of user interactions, such as taps versus gestures) to specific functions. As another example, the function determination module 125 may comprise a lookup table that maps specific objects (or classes of objects) to specific functions.

In some embodiments, the function determination module 125 may comprise code for communicating with another electronic device via a network to determine a function. For example, in one such embodiment, the function determination module 125 may comprise code to query one or more servers over the Internet to determine a function associated with a particular user interaction and/or object.

In some embodiments, the object interaction detection module 124 comprises code that determines the characteristics of a virtual object. For example, the object interaction detection module 124 may consult with locations in memory 104 to determine characteristics of the virtual object.

Haptic effect determination module 126 represents a program component that analyzes data to determine a haptic effect to generate. The haptic effect determination module 126 may comprise code that selects one or more haptic effects to output using one or more algorithms or lookup tables. In some embodiments, the haptic effect determination module 126 comprises one or more algorithms or lookup tables useable by the processor 102 to determine a haptic effect.

In some embodiments, haptic effect determination module 126 comprises code that determines a haptic effect to output based on a characteristic of the user interaction. For example, the haptic effect determination module 126 may determine a haptic effect comprising a number of pulsed vibrations corresponding to the number of times a user rotated an object 360 degrees. As another example, the haptic effect determination module 126 may determine a haptic effect due to the user interaction comprising a two finger pinch gesture along a surface of the object rather than a tap on the object.

In some embodiments, haptic effect determination module 126 comprises code that determines a haptic effect to output based on a characteristic of the object. For example, the haptic effect determination module 126 may determine a haptic effect comprising a pulsed vibration if the object is sharp. This may warn the user that the user is handling a potentially dangerous object. As another example, the haptic effect determination module 126 may comprise code that determines a haptic effect comprising a wooden texture if the object comprises wood, a metal texture if the object comprises metal, or a rubber texture if the object comprises rubber.

In some embodiments, haptic effect determination module 126 comprises code that determines a haptic effect to output based on a characteristic of the function. For example, the haptic effect determination module 126 may determine a haptic effect to be output prior to the function being executed. This may alert the user that the function is going to be performed or cannot be performed. As another example, the haptic effect determination module 126 may determine a haptic effect to be output after the function is executed. This may alert the user that the function was performed. As another example, the haptic effect determination module 126 may determine a haptic effect configured to indicate that an operation is ongoing or has failed (e.g., that the function has failed). For instance, if the function comprises downloading content (e.g., from a server), the haptic effect determination module 126 may determine a haptic effect comprising a pulsed sensation indicative of the progress of the download. As yet another example, the haptic effect determination module 126 may determine a different haptic effect if the function comprises purchasing an object using the Internet than if the function comprises adding an object to a shopping list. This may alert the user to the function being executed.

Haptic effect generation module 128 represents programming that causes processor 102 to generate and transmit haptic signals to the haptic output device 118 to generate the selected haptic effect. For example, the haptic effect generation module 128 may access stored waveforms or commands to send to the haptic output device 118 to create the desired effect. In some embodiments, the haptic effect generation module 128 may comprise algorithms to determine the haptic signal. Further, in some embodiments, haptic effect generation module 128 may comprise algorithms to determine target coordinates for the haptic effect (e.g., coordinates for a location on the computing device 101 or object at which to output a haptic effect).

Although the modules 124, 125, 126, 128 are depicted in FIG. 1 as program components within the memory 104, in some embodiments, the modules 124, 125, 126, 128 may comprise hardware. For example, modules 124, 125, 126, 128 may comprise analog to digital converters, processors, microcontrollers, comparators, amplifiers, transistors, and other analog or digital circuitry.

Figure 2:
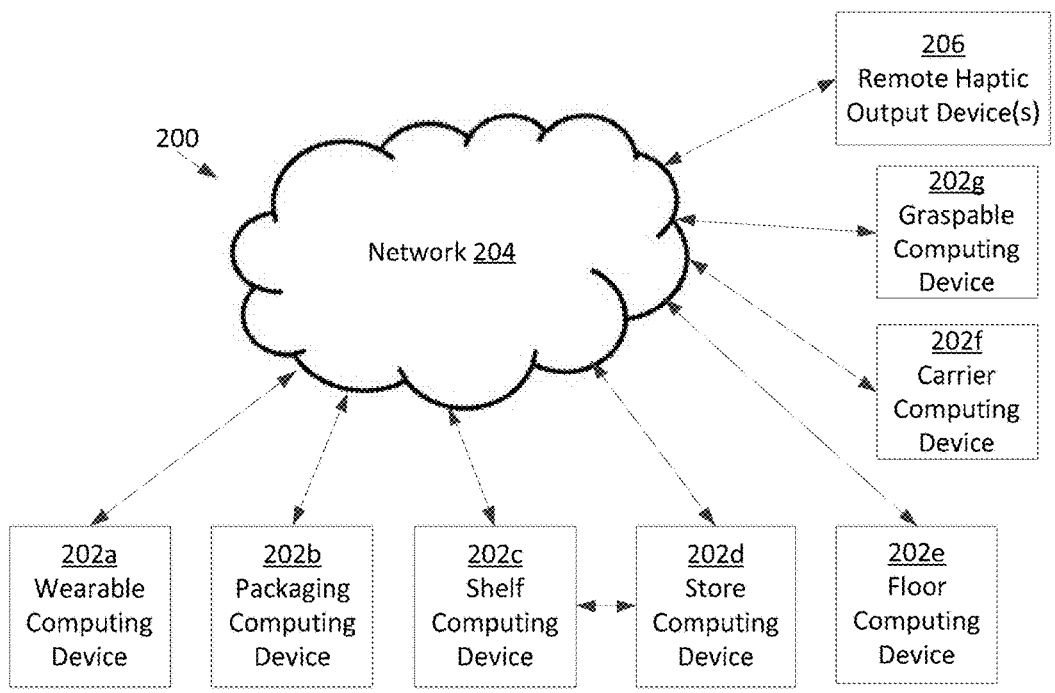
FIG. 2 is another block diagram showing a system for haptically-enabled interactions with objects according to another embodiment.

FIG. 2 is another block diagram showing a system for haptically-enabled interactions with objects according to another embodiment. The system 200 may comprise one or more remote haptic output devices 206. The system 200 may also comprise one or more computing devices 202a-g.

In the embodiment shown in FIG. 2, the system 200 comprises a wearable computing device 202a, a packaging computing device 202b, a shelf computing device 202c, a store computing device 202d, a floor computing device 202e, a carrier computing device 202f, and a graspable computing device 202g. A wearable computing device 202a may comprise a computing device associated with a wearable device (e.g., a ring) that is configured to be worn by the user. A packaging computing device 202b may comprise a computing device that is at least partially embedded within an object's packaging (e.g., an object's wrapper or container). A shelf computing device 202c may comprise a computing device that is at least partially embedded within or coupled to a shelf (e.g., for holding a product for sale in a store or a bookshelf). A store computing device 202d may comprise a computing device associated with a seller, manufacturer, and/or distributer of an object. A floor computing device 202e may comprise a computing device that is at least partially embedded within or coupled to a floor (e.g., within one or more floor tiles of a store). A carrier computing device 202f may comprise a computing device that is at least partially embedded within or coupled to a carrying device for holding an object (e.g., a shopping cart, basket, bag, or backpack). A graspable computing device 202g may comprise a computing device associated with a graspable device (e.g., a mobile phone) configured to be grasped by the user. These computing devices 202a-g are described in greater detail below.

The computing devices 202a-g and remote haptic output device(s) 206 may be connected to a network 204. The network 204 may be any suitable number or type of networks or links, including, but not limited to, a dial-up network, a local area network (LAN), wide area network (WAN), public switched telephone network (PSTN), a cellular network, a WiFi network, the Internet, an intranet or any combination of hard-wired and/or wireless communication links. In some embodiments, the network 204 is a single network. In other embodiments, the network 204 may comprise two or more networks.

The computing devices 202a-g and remote haptic output device(s) 206 may directly communicate with each other and/or may communicate with each other via the network 204. For example, the shelf computing device 202c may directly wirelessly communicate with store computing device 202d (e.g., using Bluetooth). Further, the computing devices 202a-g and remote haptic output device(s) 206 may communicate with one or more remote servers (e.g., cloud servers, webservers, or other servers), databases, and/or computing devices via the network.

As described above, the system 200 may comprise a wearable computing device 202a. The wearable computing device 202a may be associated with a wearable device, comprising, for example, a watch, wristband, hat, sleeve, jacket, collar, glasses, glove, ring, articles of clothing, headband, and/or jewelry. Upon a user interacting with an object, the wearable computing device 202a may execute a function and/or output a haptic effect to a body part of the user (e.g., the user's wrist, arm, leg, foot, hand, finger, neck, head, or chest).

For example, the wearable computing device 202a may comprise a watch. Upon the user tapping the watch with a book (e.g., that the user wants to read), the wearable computing device 202a may detect the tap and purchase an electronic version of the book (e.g., from the store computing device 202d) via the network 204. The wearable computing device 202a may output a haptic effect configured to notify the user that the book has been purchased. The wearable computing device 202a may also communicate with another electronic device (not shown), such as the user's e-reader, and initiate the download of the electronic book to the electronic device. As the book downloads to the electronic device, the wearable computing device 202a may output haptic effects associated with the progress of the download. For example, the wearable computing device 202a may output a vibration with an increasing frequency as the download progresses. Once the book has finished downloading, the wearable computing device 202a may output another haptic effect, such as a jolt sensation. This may notify the user that the book has been downloaded to the electronic device.

As described above, the system 200 may comprise a packaging computing device 202b. For example, the packaging computing device 202b may be embedded within or coupled to the packaging of an object. The packaging computing device 202b may comprise a sensor (e.g., an accelerometer, pressure sensor, capacitive sensor, resistive sensor, 3D imaging system, or a LED-based tracking system) configured to detect a user interaction with an object and/or the object's packaging. For example, the sensor may comprise a pressure sensor embedded within a portion of the object's packaging. The pressure sensor may be able to detect contact by a user. Based on signals from the sensor, the packaging computing device 202b may be configured to execute a function and/or output a haptic effect (e.g., directly to the user's hand or finger as the user contacts the object).

For example, the object may comprise a drug from a pharmacy. The packaging computing device 202b may be, for example, embedded within the cap of the drug container. Upon the user picking up the drug container and rotating it 360 degrees, the packaging computing device 202b may detect the user interaction and order a refill of the drug via the network 204. In some embodiments, if the refill is successfully ordered, the packaging computing device 202b output a haptic effect comprising three pulses. If the refill cannot be ordered (e.g., because the user has exceeded a refill quota), the packaging computing device 202b may output a jolt sensation or no haptic effect.

As described above, the system 200 may comprise a shelf computing device 202c. The shelf computing device 202c may comprise a sensor (e.g., a pressure sensor, light or optical sensor, button, switch, accelerometer, position sensor, 3D imaging system, or a LED-based tracking system) configured to detect a user interaction with an object. For example, the sensor may comprise a pressure sensor positioned under an object on the shelf. The sensor may be configured to detect a user lifting an object off the shelf. Based on signals from the sensor, the shelf computing device 202c may be configured to execute a function and/or output a haptic effect. For example, a user may take an object off a shelf. The shelf computing device 202c may determine that the user took the last of the particular object available from the shelf. The shelf computing device 202c may notify (e.g., via text message, e-mail, or other alert system) a store manager that the shelf needs to be restocked.

As described above, the system 200 may comprise a store computing device 202d. The store computing device 202d may be associated with a seller, manufacturer, and/or distributer of an object. For example, the store computing device 202d may be owned or operated by the store in which the object is for sale. The store computing device 202d may facilitate purchasing the object (e.g., process credit card transactions, coupons, discounts, store rewards cards, and/or otherwise conduct a purchase). In some embodiments, the store computing device 202d may comprise data (e.g., in a database) associated with the object. For example, the store computing device 202d may comprise a name, weight, size, price, discount, manufacturer, list of ingredients, and/or other characteristic associated with the object. One or more other computing devices 202a-c, 202e-f may communicate with the store computing device 202d to determine a characteristic associated with the object. For example, the wearable computing device 202a may transmit a query associated with the object to the store computing device 202d. The store computing device 202d may receive the query and consult a database to determine the quantity of the object available for sale in the store. The store computing device 202d may transmit a signal associated with the quantity to the wearable computing device 202a.

In some embodiments, the store computing device 202d may be configured to detect a user interaction with an object. For example, the store computing device 202d may be in wired or wireless communication with an interaction sensor. The interaction sensor may comprise, for example, a depth sensor oriented toward an object. Upon the user interacting with an object, the store computing device 202d may determine a function to execute (e.g., send the user an e-mail with a discount coupon for the object). Based on the object and/or function, the store computing device 202d may cause the remote haptic output device 206 and/or another computing device 202a-c, 202e-f to output a haptic effect. For example, the store computing device 202d may transmit a signal to a wearable computing device 202a configured to cause the wearable computing device 202a to output a short vibration. This may alert the user that the user is going to receive a discount coupon for the object.

As described above, the system 200 may comprise a floor computing device 202e. The floor computing device 202e may execute a function and/or output a haptic effect (e.g., a vibration) upon the user interacting with an object. For example, upon a user touching a product in a store, the floor computing device 202e may determine if the product is on sale. If so, the floor computing device 202e may output a high-magnitude vibration. The user may perceive the haptic effect via the user's feet or another body part. In other embodiments, the floor computing device 202e may comprise a computing device in communication with a remote haptic output device 206 that is embedded in or coupled to the floor. Upon the user interacting with an object, the floor computing device 202e may cause the remote haptic output device 206 to output a haptic effect (e.g., to the user's feet or another body part).

As described above, the system 200 may comprise a carrier computing device 202f. In some embodiments, the carrier computing device 202f executes a function and/or outputs a haptic effect upon a user interacting with an object. For example, a user may be holding a shopping basket comprising a carrier computing device 202f. The carrier computing device 202f may comprise one or more sensors configured to detect if a user has placed product in the shopping cart. Upon the user placing a product in the shopping cart, the carrier computing device 202f may detect the product and remove the product from the user's digital shopping list. The carrier computing device 202f may also determine the price of the product (e.g., by communicating with store computing device 202d or via the Internet). The carrier computing device 202f may update a total price associated with the objects in the shopping cart. In some embodiments, if the total price exceeds a threshold (e.g., $150), the carrier computing device 202f may output a haptic effect. This may notify the user that the user has exceeded a spending limit (e.g., input or customizable by the user).

As described above, the system 200 may comprise a hand-held or graspable computing device 202g. The graspable computing device 202g may comprise, for example, a mobile device, e-reader, tablet, wand, stylus, or pen. In some embodiments, the graspable computing device 202g may be, for example, positioned in the user's pants pocket (or shirt pocket). Upon user interacting with an object, the graspable computing device 202g may execute a function and/or output a haptic effect to the user's thigh (or chest). In other embodiments, the user may interact with the object using the graspable computing device 202g as an intermediary, for example, as described below with respect to FIG. 5B.

The system 200 may additionally or alternatively comprise one or more computing devices positioned in other locations or configurations. For example, the system 200 may comprise a computing device positioned within the object. For instance, the object itself may comprise a computing device. In some embodiments, upon a user interacting with the object (e.g., picking up the object), the computing device may execute a function and/or output a haptic effect (e.g., to the user's hand).

In some embodiments, any of the computing devices 202a-g may cause any of the other computing device 202a-g (and/or the remote haptic output device 206) to output a haptic effect. For example, a user may be shopping for a toy in a toy store. A packaging computing device 202b may detect the user tapping on the box of a toy. For instance, the packaging computing device 202b may comprise a pressure sensor configured to detect a user interaction. Upon the user tapping on the box of the toy, the packaging computing device 202b may detect the user interaction based on sensor signals from the pressure sensor. The packaging computing device 202b may transmit a signal to a wearable computing device 202a, e.g., worn on the user's wrist. The signal may cause the wearable computing device 202a to check the user's bank balance. In some embodiments, if the user has enough money to purchase the toy, the wearable computing device 202a may output a vibration.

As another example, the packaging computing device 202b may detect the user picking an object (e.g., a box of cereal) up off of a shelf. For instance, the packaging computing device 202b may comprise an accelerometer. Upon the user picking up the object, the packaging computing device 202b may detect the user interaction based on sensor signals from the accelerometer. The packaging computing device 202b may transmit a signal to the remote haptic output device 206. The signal may be configured to cause the remote haptic output device 206 to output a puff of air at the user's head. This may allow the packaging computing device 202b to cause a haptic effect to be output to a body part of the user (e.g., the user's head) to which the packaging computing device 202b may otherwise be unable to output haptic effects.

As still another example, the user may be wearing a computing device 202a comprising a camera. Upon the wearable computing device 202a detecting that a user is holding an egg (e.g., via the camera), the wearable computing device 202a may determine whether the egg is the last egg in the user's refrigerator (e.g., by communicating with the refrigerator, or analyzing images of the refrigerator and/or egg carton). If so, the wearable computing device 202a may output a haptic effect comprising a short vibration. The user may perceive the short vibration as a query as to whether the user would like to purchase more eggs. The user may rotate the egg by 90 degrees, which may indicate that the user would like to purchase additional eggs. The wearable computing device 202a may detect the rotation and transmit a signal to a store computing device 202d (e.g., at a remote grocery store). The signal may cause the store computing device 202d to process the purchase and arrange for the eggs to be delivered to the user's home. Upon completion of the order, the store computing device 202d may transmit a confirmation signal to the wearable computing device 202a. The signal may cause the wearable computing device 202a to determine a haptic effect such as a pulsed vibration. The wearable computing device 202a may then output this haptic effect via a haptic output device. The haptic effect may indicate that the purchase was successful.

Figure 3:
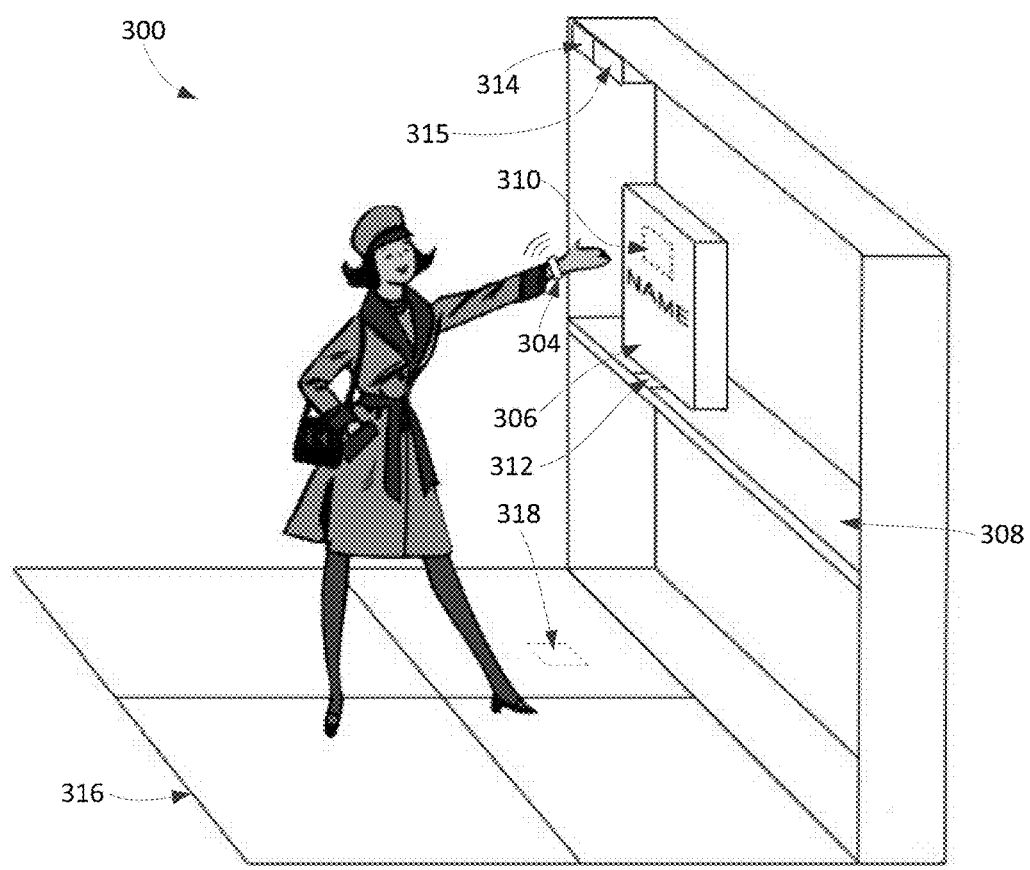
FIG. 3 shows an embodiment of a system for haptically-enabled interactions with objects.

FIG. 3 shows an embodiment of a system for haptically-enabled interactions with objects. The system 300 comprises an object 306 positioned on a shelf 308. The object 306 may comprise a toy, computer, mobile device, automotive component, movie, video game, video game console, appliance, television, medical device, mechanical or electrical component, remote control, food, etc. The system 300 may be associated with a store, warehouse, restaurant, medical center, garage, house, office, apartment, or other location.

In the embodiment shown in FIG. 3, an interaction sensor 315 (e.g., a 3D imaging system) is oriented toward the object 306. The interaction sensor 315 may detect a user interaction (e.g., tap, touch, gesture on, shake, lift, gesturing toward, etc.) with the object 306. The user may interact with the object 306, for example, to perform a function (e.g., open a webpage, purchase the object 306, receive a discount associated with the object 404, add the object 306 to a list, remove the object 306 from a list, download a file associated with the object 306, etc.) associated with the object 306. The interaction sensor 315 may transmit a sensor signal to one or more computing devices 304, 310, 312, 318. Based on the user interaction, one or more of the computing devices 304, 310, 312, 318 may execute the function. The one or more computing devices 304, 310, 312, 318 may then output a haptic effect, e.g., associated with the function.

In this example, the system 300 comprises a wearable computing device 304 that includes a wristband or watch. The system 300 also comprises a packaging computing device 310, a shelf computing device 312, a floor computing device 318, and a remote haptic output device 314. The remote haptic output device 314 may be in wired or in wireless communication with the computing devices 304, 310, 312, 318. In some embodiments, upon the user interacting with the object 306, one or more computing devices 304, 310, 312, 318 may execute a function associated with the interaction and/or object 306. For example, the function may comprise communicating with a remote server to determine whether the object 306 is on sale. Further, one or more of the computing devices 304, 310, 312, 318 may cause the remote haptic output device 314 to output a remote haptic effect. For example, if the object 306 is on sale, the wearable computing device 304 may transmit a signal configured to cause the remote haptic output device 314 to output an ultrasonic pressure wave directed toward the user's hand. The user may perceive the ultrasonic pressure wave as a vibration on the user's hand. The haptic effect may indicate to the user that the object 306 is on sale. In some embodiments, the wearable computing device 304 may not cause the remote haptic output device 314 to output a haptic effect if the object 306 is not on sale. The lack of a haptic effect may indicate to the user that the object 306 is not on sale.

Figure 4:
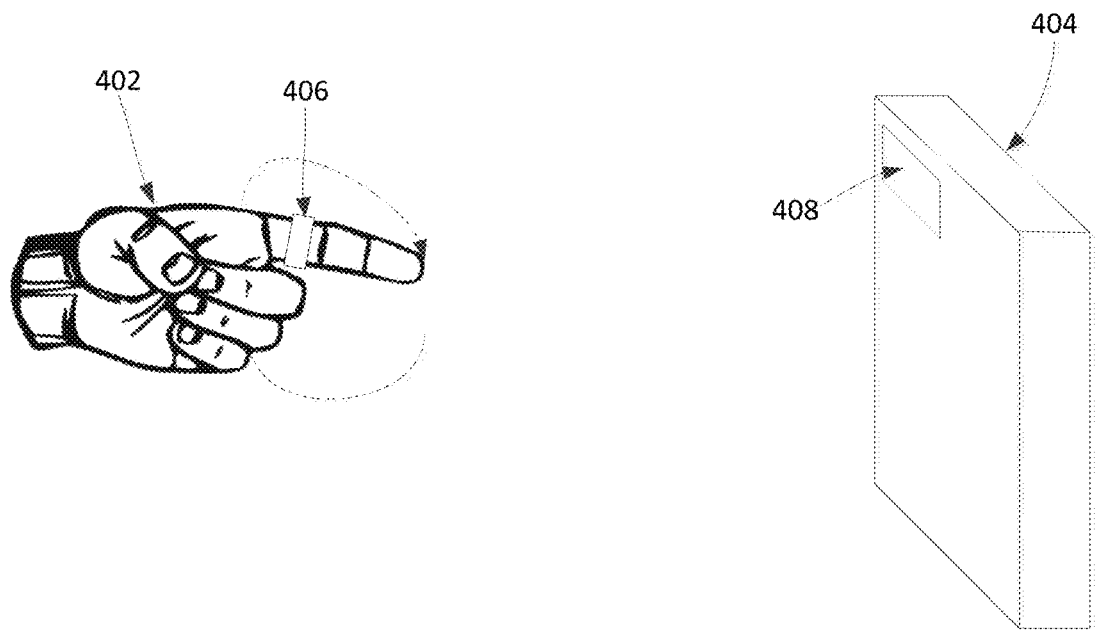
FIG. 4 shows another embodiment of a system for haptically-enabled interactions with objects.

FIG. 4 shows another embodiment of a system for haptically-enabled interactions with objects. In this example, the user 402 is wearing a computing device 406 comprising a ring. The user 402 is interacting with an object 404 by making a gesture in the air. In some embodiments, the gesture may be oriented toward the object 404 or within a predefined distance (e.g., 2 feet) from the object 404. For example, the user 402 may wave at, point at, reach for, and/or use a finger to draw a symbol in the air in front of the object 404. The computing device 406 may detect the user interaction and determine the user's gesture. Based on the characteristics of the gesture and/or the object 404, the computing device 406 may determine a function to execute. The computing device 406 may then execute the function and/or output a haptic effect associated with the function.

For example, the user 402 may make a gesture in the air to execute a function associated with the object 404, e.g., to add an address 408 (e.g., a return address) that is printed on the object 404 to a contact list or address book. In the embodiment shown in FIG. 4, the user 402 is drawing a "C" shape in the air in front of an object 404. The computing device 406 may detect a gesture and determine that the user 402 is making a "C" shaped gesture. The computing device 406 associate the "C" shaped gesture with adding a contact to the user's contact list or address book. The computing device 406 may further determine that the object 404 comprises a piece of mail. Based on the "C" gesture, the computing device 406 may determine an address (e.g., an address 408) associated with the piece of mail (e.g., written on the piece of mail). The computing device 406 may add the address 408 to the user's contact list or address book. In some embodiments, the computing device 406 may output a haptic effect comprising a light vibration, e.g., to indicate that the address was successfully added to the user's contact list.

In some embodiments, the object 404 may comprise a business card. The address 408 may comprise a phone number (e.g., associated with the business). The user 402 may make a gesture in the air (e.g., a "C" shape) to execute a function associated with the object 404, e.g., to call the phone number. In some embodiments, the computing device 406 may detect the gesture and associate the gesture with calling a phone number. The computing device 406 may determine a phone number associated with the address 408 and call the phone number. In some embodiments, the computing device 406 may further output a haptic effect, e.g., to indicate that the computing device 406 has initiated a phone call.

In some embodiments, the computing device 406 may be in a "wait mode." In the wait mode, the computing device 406 may wait to detect a specific user interaction with an object 404 (e.g., tapping on the object 404, squeezing the object 404 twice, or making a pinching gesture oriented toward the object 404) before executing any functions. For example, if the computing device 406 is in the wait mode and detects a user interaction comprising a "C" shaped gesture, the computing device 406 may not add an address to the user's contact list. In some embodiments, upon detecting the specific user interaction, the computing device 406 may enter a "function execution" mode. Once in the function execution mode, the computing device 406 may execute functions associated with subsequent user interactions with the object 404. For example, upon entering the function execution mode, if the computing device 406 detects a "C" shape gesture by the user 402 oriented toward the object 404, the computing device 406 may add an address 408 associated with the object 404 to the user's contact list. In some embodiments, the computing device 406 may return to the wait mode, for example, after detecting a specific user interaction (e.g., the user 402 shaking a hand) or after a period of time (e.g., 10 seconds). In some embodiments, this may allow the user 402 to interact with objects 404 without triggering functions until the user intends to trigger such functions.

Figure 5A:
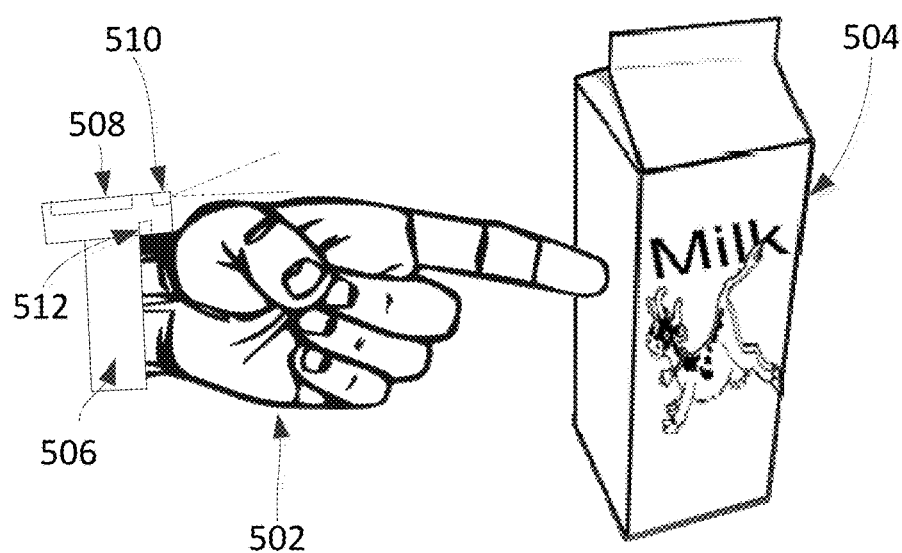
FIG. 5A shows still another embodiment of a system for haptically-enabled interactions with objects.

FIG. 5A shows still another embodiment of a system for object manipulation with haptic feedback. In this example, the user 502 is wearing a watch comprising the computing device 506. The user 502 is interacting with an object 504 (e.g., a milk carton) by contacting (e.g., tapping or touching) the object 504. The computing device 506 may detect the contact via interaction sensor 510 (e.g., embedded within the computing device 506). The interaction sensor 510 may comprise, for example, a camera oriented toward the object 504. Based on the characteristics of the contact and/or the object 504, the computing device 506 may determine a function associated with the object 404. The computing device 506 may then execute the function and/or output a haptic effect associated with the function via a haptic output device 512.

Figure 5B:
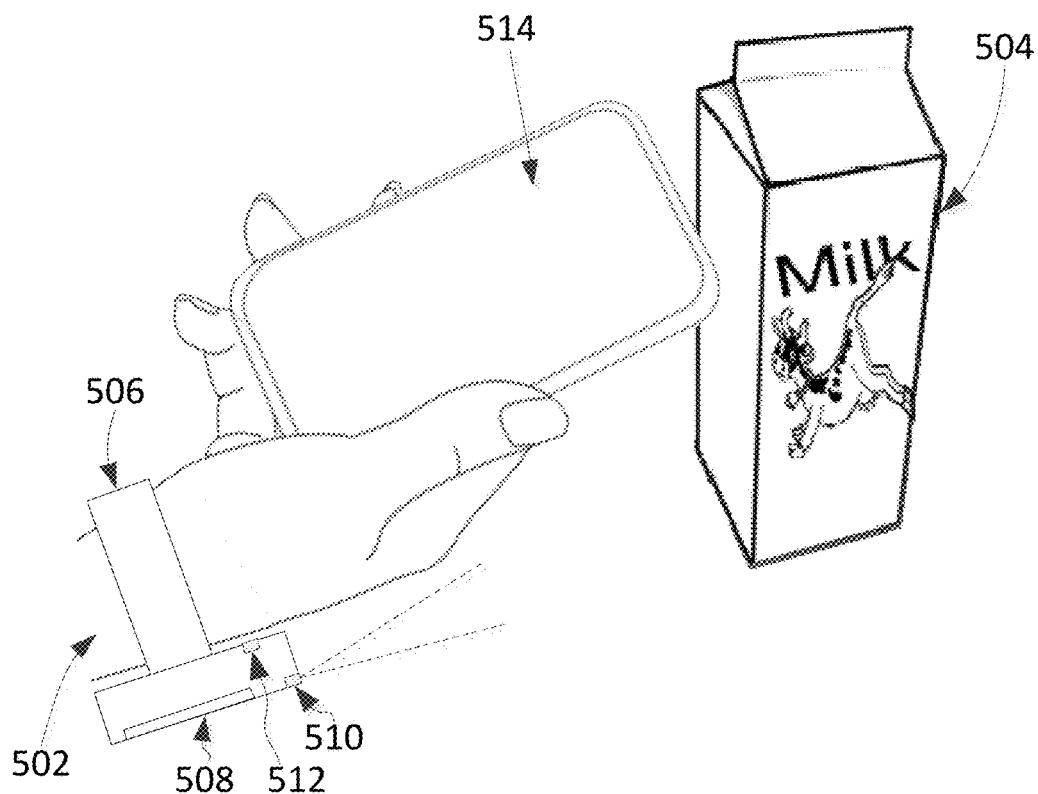
FIG. 5B shows yet another embodiment of a system for haptically-enabled interactions with objects.

In some embodiments, the user may use an intermediary object (e.g., a stylus, pen, cane, or wand) for an interaction, and the computing device 506 may detect such an interaction. For example, as shown in FIG. 5B, the user 502 may contact the object 504 with an intermediary object 514 comprising a mobile phone. The computing device 506 may detect the contact and execute an associated function. For example, the computing device 506 may detect the contact and call a phone number associated with the object 504 (e.g., the manufacturer's phone number, a support phone number, or a product information phone number). In some embodiments, the intermediary object 514 comprises the computing device 506 (e.g., rather than the computing device 506 being separate from the intermediary object 514). For example, rather than the user 502 wearing the computing device 506 on a wrist, the mobile phone may be the computing device.

The computing device 506 may detect a contact anywhere on the object 504, or a contact with a specific location (e.g., the label) on the object 504. The computing device 506 may detect a location of the contact. For example, the computing device 506 may detect which portion of the object 504 (e.g., the top, bottom, left side, right side, front, back, a label, an image, a logo, a piece of text, etc.) was contacted by the user. In some embodiments, the computing device 506 may execute a function upon the user interacting with a specific portion of the object 504. For example, the user 502 may contact a manufacturer's logo on the object 504. The computing device 506 may detect the interaction with the manufacturer's logo and open a browser to the manufacturer's website. Upon the user interacting with a different portion of the object 504 (e.g., a nutritional label), the computing device 506 may execute a different function (e.g., the computing device 506 may determine the food ingredients making up the object 504) or may not execute a function at all.

In some embodiments, the computing device 506 may detect the contact and determine information associated with the object 504. For example, the user 502 may contact an object 504 to receive information associated with the price of the object 504. The computing device 506 may detect the contact and determine the price of the object 504 (e.g., by querying one or more servers over a network). In some embodiments, if the price is below a threshold (e.g., input by the user), the computing device 506 may output a haptic effect (e.g., a pulsed vibration). This may indicate to the user 502 that the object 504 has a price that is acceptable to the user 502. In other embodiments, the computing device 506 may perform a price comparison with other local stores. The computing device 506 may output a haptic effect (e.g., comprising two pulsed vibrations) configured to notify the user 502 that the price may be cheaper at another local store (e.g., a store within a 15 mile radius) or through an online retailer.

In some embodiments, the computing device 506 may detect multiple user interactions (or a single user interaction comprising multiple contacts) with the object 504. For example, in some embodiments, the object 504 may comprise a map. The user 502 may touch the map at a starting point on the map with a finger. The user 502 may sequentially or simultaneously (with another finger) touch the map at a destination location. The computing device 506 may detect the user interactions and execute one or more functions. For example, the computing device 506 may detect the two touches and retrieve driving directions from the starting point to the destination location. As another example, the computing device 506 may detect a user interaction with a business card (or another object 504) comprising an address. For instance, the computing device 506 may detect the user 502 tapping on the business card two times. The computing device 506 may detect the two taps and, for example, set the destination of a navigation application to the address.

In some embodiments, the object 504 may comprise a virtual object. The virtual object may be, for example, output on the display 508. In one such embodiment, the virtual object comprises images representing food items in the user's fridge. For instance, the virtual object may comprise an image of a bottle of milk, carrots, a piece of meat, etc. The computing device 506 may be configured to detect a user interaction with the virtual object. For example, a user 502 may double tap on the display (e.g., which may be a touchscreen display) on a location associated with the bottle of milk. Based on the user interaction, the computing device 506 may determine information associated with the virtual object. For example, based on the double tap, the computing device 506 may determine, for example, how many bottles of milk the user 502 has in the user's refrigerator. The computing device 506 may output a haptic effect associated with the information. For example, the computing device 506 may output a number of pulsed vibrations equal to the number of bottles of milk in the user's refrigerator.

In some embodiments, the function comprises outputting a sound. For example, the computing device 506 may detect a user interaction with an object 504 and determine a commercial associated with the object 504. In some embodiments, the computing device 506 may output audio associated with the commercial (e.g., the audio track associated with the commercial). As another example, the computing device 506 may detect a user interaction with an object 504 (e.g., a CD or tape) and determine a song associated with the object 504. In some embodiments, the computing device 506 may output the song. The computing device 506 may also output a haptic effect comprising pulsed vibrations that are timed with specific portions of the song.

As another example, the computing device 506 may detect a user interaction with an object 504 and determine the price of the object 504. In one embodiment, if the price is below a threshold (e.g., input by the user), the computing device 506 may output the sound of a cash register opening (e.g., "ching ching"). In some embodiments, the computing device 506 may also output a haptic effect comprising a pulsed vibration. The sound and/or haptic effect may notify the user that the object 504 has an acceptable price.

In some embodiments, the function comprises outputting data on a display 508. For example, the computing device 506 may play a video on the display 508 in response to a user interaction with an object 504. For instance, the user may interact with an object comprising a movie poster. In some embodiments, the computing device 506 may play a video of a movie trailer associated with the movie poster. In some embodiments, the computing device 506 may also output one or more haptic effects, e.g., timed with specific portions of the movie trailer (e.g., the computing device 506 may output an intense vibration during a car chase in the movie trailer).

As another example, a user 502 may tap on an object 504 in a store. The computing device 506 may determine the quantity of the object 504 the store has left in stock (e.g., by querying a server associated with the store). In some embodiments, the computing device 506 may output the quantity on a display 508. The computing device 506 may also output a haptic effect associated with the quantity (e.g., if the quantity is below a threshold).

As still another example, a user 502 may tap on an object 504 in a store. The computing device 506 may determine the price of the object 504 in the store and the average price of the object 504 (e.g., as determined based on prices from a plurality of stores). If the price in the store is lower than the average price of the object 504, the computing device 506 may output a single dollar sign on the display 508. In some embodiments, the computing device 506 may also output a haptic effect comprising a stroking sensation. If the price is higher than the average price of the object 504, the computing device 506 may output three dollar signs on the display 508. In some embodiments, the computing device 506 may also output a haptic effect comprising a stinging sensation. If the user 502 makes another gesture (e.g., if the user 502 taps the object 504 again), the computing device 506 may purchase the object 504. In some embodiments, upon completion of the purchase, the computing device 506 may output a notification on the display 508. The notification may alert the user that the object 504 has been purchased. In some embodiments, the computing device 506 may alternatively or additionally output a haptic effect, e.g., configured to notify the user 502 that the object 504 was purchased. Thus, video, haptic effects, and/or sound can be used to provide information to the user 502 about an object 504.

In some embodiments, the computing device 506 may execute a function and/or output a haptic effect substantially simultaneously with the user interaction. For example, the computing device 506 may execute multiple functions (e.g., determine that a user interaction with the object 504 occurred, determine a characteristic of the object 504, and execute a function based on the characteristic) substantially simultaneously with the user interaction. The computing device 506 may also output a haptic effect associated with the function substantially simultaneously with the user interaction.

Figure 6:
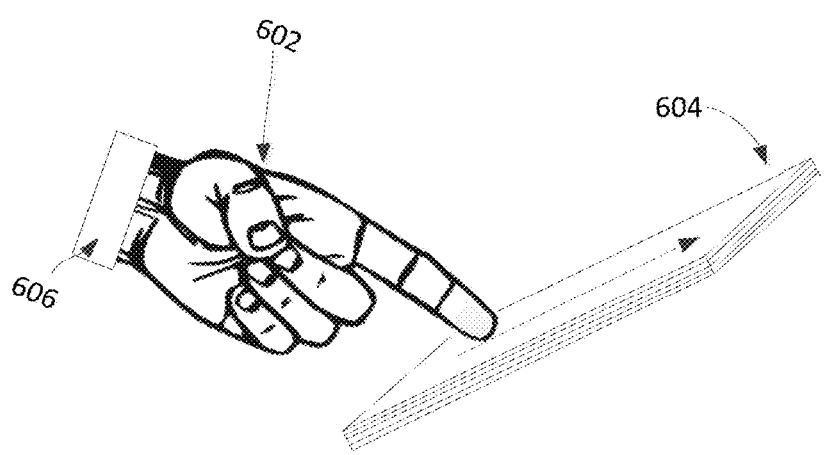
FIG. 6 shows another embodiment of a system for haptically-enabled interactions with objects

FIG. 6 shows another embodiment of a system for object manipulation with haptic feedback. In this example, the user 602 is wearing a computing device 606 comprising a wrist band. The user may gesture on a surface of the object 604 to interact with the object. For example, the user may perform a two finger pinch on, move multiple fingers along, or make a checkmark on a surface of the object 604.

In some embodiments, the computing device 606 detects a gesture and, based on the gesture and/or the object 604, determines a function. For example, in the embodiment shown in FIG. 6, the user 602 is interacting with the object 604 by moving a finger longitudinally across a front surface of the object 604. The object 604 may comprise, for example, documents (e.g., medical records). This user may be making this gesture to, for example, print a copy of the documents. Based on this specific gesture, the computing device 606 may output a short vibration. This may indicate to the user that the computing device 606 is going to print the documents if another user interaction is not detected within a predefined time period (e.g., 5 seconds). The computing device 606 may further output a vibration with an increasing magnitude and/or frequency until the time period expires. This may indicate to the user 602 the amount of time left to cancel the print job.

In some embodiments, if the user 602 makes a cancellation gesture before the time period expires, the computing device 606 may detect the cancellation gesture and cancel the print job. The cancellation gesture may comprise a specific gesture, such as a double tap on the surface of the object 604, or any gesture at all. The computing device 606 may output a haptic effect (e.g., a jolt) to indicate to the user 602 that the print job was cancelled. If the user 602 does not make a cancellation gesture within the time period, the computing device 606 may cause the documents to be printed. Upon the print job completing, the computing device 606 may output a haptic effect, e.g., configured to notify the user that the print job is complete.

In some embodiments, the user 602 may use the object 604 as an intermediary for an interaction. The computing device 606 may detect such an interaction. For example, the user 602 may tap the object 604 (e.g., a document) against a computer monitor or a photocopy machine. In some embodiments, the computing device 606 may detect the user interaction and determine a function comprising, for example, copying text associated with the object 604 to a virtual clipboard or saving text associated with the object 604 to a virtual location. The computing device 606 may further output a short vibration. This may indicate to the user that the computing device 606 has successfully copied or saved the text associated with the object 604.

In some embodiments, a user interaction may comprise causing an interaction between multiple objects 604. For example, the user 602 may tap the object 604 against another object. For instance, the user 602 may tap a stack of papers against a printer. In some embodiments, the computing device 606 may detect the interaction between the multiple objects and determine an associated function. The computing device 606 may execute the function. For example, the computing device 606 may detect the interaction between the stack of papers and the printer and cause data associated with the stack of papers to be printed. In some embodiments, the computing device 606 may also output a haptic effect, e.g., upon the completion of the print job. This may alert the user that the print job is complete.

In some embodiments, specific interactions between multiple objects 604 can be mapped to specific functions (e.g., via a lookup table). For example, an interaction comprising tapping a stack of papers with a miniature model printer can be associated with a function comprising printing copies of the papers. In some embodiments, the computing device 606 can detect such an interaction and cause copies of the papers to be printed on a printer. As another example, an interaction comprising tapping a business card against a phone can be associated with a function comprising calling a phone number associated with (e.g., printed on) the business card. In some embodiments, the computing device 606 may detect such an interaction and call the phone number.

Figure 7:
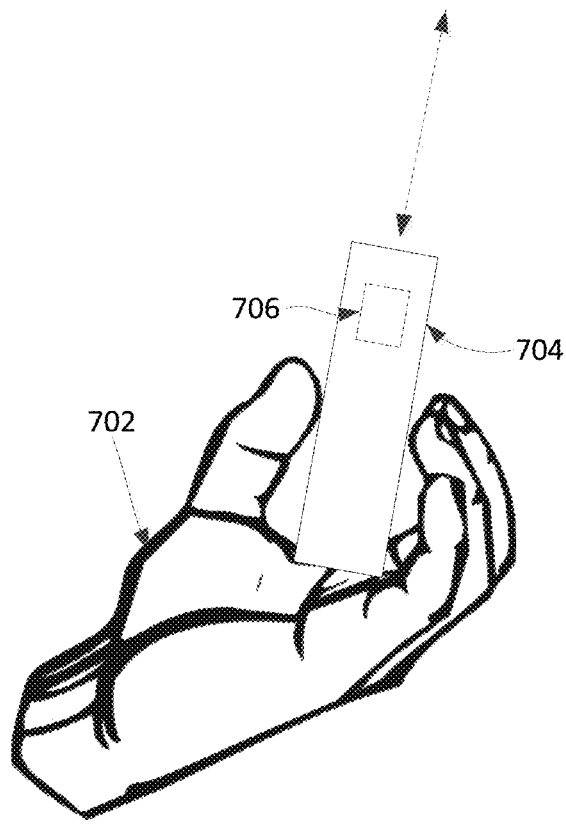
FIG. 7 shows still another embodiment of a system for haptically-enabled interactions with objects.

FIG. 7 shows still another embodiment of a system for object manipulation with haptic feedback. In some embodiments, the user 702 may interact with an object 704 by making a gesture using the object 704. For example, the user 702 may move the object 704 in real space (e.g., using the object to draw a letter or number in the air, rotating the object, tilting the object, moving the object to a specific location, etc.).

In the embodiment shown in FIG. 7, the user 702 is shaking the object 704 up and down. The computing device 706 may be configured to execute one or more functions based on the shaking interaction. For example, in one embodiment, the object 704 may comprise an alarm clock. The computing device 706 may detect the shake and set an alarm (e.g., associated with the time currently output on the alarm clock or previously input by the user). The computing device 706 may output a haptic effect (e.g., a single pulsed vibration) configured to notify the user that the alarm has been set. If the user 702 thereafter shakes the object 704 again, the computing device 706 may turn off the alarm. The computing device 706 may further output a haptic effect (e.g., three pulsed vibrations) configured to notify the user that the alarm has been turned off.

In another embodiment, the object 704 may comprise car keys. The computing device 706 may be remote from the object 704 and configured to detect an interaction with the car keys. For example, the computing device 706 may comprise a camera positioned in the user's home and oriented toward the car keys. The user 702 may jiggle the car keys, e.g., as the user 702 is leaving the user's house. The computing device 706 may detect the jiggle and transmit text messages or e-mails to a predefined group of friends (e.g., input by the user 702, the user's friends, or a third party). The content of the text message or e-mail may comprise, for example, "I'm on my way!" This may indicate to the friends that the user is on the user's way to meet the group.

In some embodiments, the user interaction may comprise moving the object 704 close to a portion of the user's body (e.g., foot, arm, leg, shoulder, hand, neck, head, back, chest, stomach, thigh, etc.) or contacting a portion of the user's body with the object 704. For example, the user 702 may want to purchase a bottle of soda. The user 702 may pick up a bottle of soda and tap his right thigh (e.g., over his wallet in his right pocket) with the bottle of soda. The computing device 706 may detect the tap and determine the quantity of the object 704 that the user 702 already has in a refrigerator at home. In some embodiments, the user 702 may have input the quantity into the computing device 706. For example, the computing device 706 may execute a shopping list application. The user may have input the quantity into the shopping list application. The computing device 706 may determine the quantity from the shopping list application. In other embodiments, the user 702 may have a smart refrigerator or other device capable of determining the contents of the refrigerator and transmitting the quantity to the computing device 706. If the user 702 has a quantity of the product below a threshold (e.g., the user 702 has less than three bottles of soda), the computing device 706 may not output a haptic effect. If the user 702 has a quantity of the product above a threshold, the computing device 706 may output a buzzing sensation. This may help the user 702 make smarter purchasing decisions.

In some embodiments, the user interaction may comprise a throwing gesture. For example, the object 704 may comprise a pen that is low on ink. The user 702 may pick up the pen and simulate tossing the pen over the user's right shoulder. The computing device 706 may detect the throwing gesture and, based on the user interaction, purchase more pens, e.g., from an online retailer.

In some embodiments, the user interaction may comprise moving the object 704 to a specific location. For example, the computing device 706 may detect the user picking up the object 704 and placing it on or within a kiosk (e.g., an information kiosk). In some embodiments, based on the user 702 putting the object 704 in this specific location, the computing device 706 may determine information associated with the object 704, such as whether the object 704 is on sale. If so, the computing device 706 may output a haptic effect (e.g., a short vibration).

In some embodiments, the user interaction may comprise moving the object 704 through an opening. For example, the computing device 706 may detect the user picking up the object 704 and exiting the store (e.g., walking through the doorway). In some embodiments, upon the user 702 walking through the store's exit (or through a store's security towers or sensors), the computing device 706 may detect an interaction comprising the user taking the object 704. The computing device 706 may execute an associated function such as, for example, purchasing the object 704 or alerting store security. In some embodiments, the computing device 706 may output a haptic effect, e.g., configured to alert the user that the object 704 has been purchased, that the user 702 is leaving the store without purchasing the object 704, or that the store's security guards have been notified (e.g., a strong vibration).

As another example, the computing device 706 may detect the user picking up the object 704 and putting the object 704 into the user's shopping cart or handbag. In some embodiments, based on the user 702 moving the object 704 through the opening of the user's shopping cart or handbag, the computing device 706 may purchase the object. The computing device 706 may also output one or more haptic effects, e.g., associated with the purchase.

As still another example, the computing device 706 may detect the user moving the object 704 through a ring-shaped object. In some embodiments, the user may move the object 704 through an object with another shape, such as a square or rectangle. The ring-shaped object may be positioned, for example, at the end of an aisle of shelves in a store. Based on the user 702 moving the object 704 through the ring's opening, the computing device 706 may execute a function. For example, in some embodiments, the computing device 706 may determine if the weight of the object 704 is below a threshold. If so, the computing device 706 may output a haptic effect.

In some embodiments, the computing device 706 may detect a plurality of user interactions with an object 704 (e.g., making a gesture in front of the object 704, contacting the object 704, making a gesture along a surface of the object 704, and making a gesture using the object 704). The computing device 706 may execute one or more functions for each detected user interaction. The computing device 706 may further output one or more haptic effects associated with one or more of the functions. For example, the object 704 may comprise a printer in the user's home. The computing device 706 may detect the user pointing a finger toward the printer, determine if the amount of ink is low, and output a haptic effect associated with the amount of ink. The computing device 706 may also detect the user tapping three times on the printer, determine an ink cartridge type compatible with the printer, and order the ink cartridge.

Figure 8:
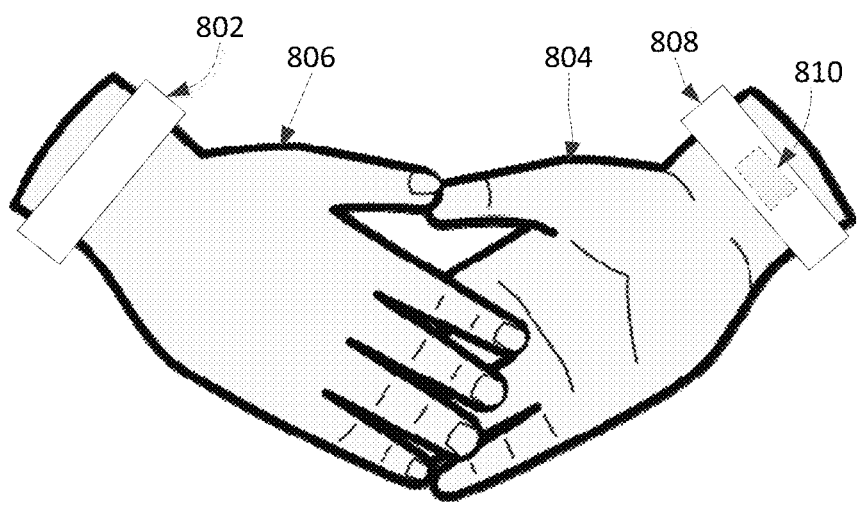
FIG. 8 shows yet another embodiment of a system for haptically-enabled interactions with objects.

FIG. 8 shows yet another embodiment of a system for object manipulation with haptic feedback. In this example, the object comprises another person 804. The user 806 may interact with the person 804 by, for example, shaking hands with the person 804. A computing device 802 associated with the user 806 may detect the interaction and execute a function based on the interaction.

In some embodiments, the function may comprise determining a characteristic of the other person 804. The characteristic may comprise, for example, a name, social security number, net worth, height, age, heritage, hair color, nationality, eye color, medical condition, credit score, gender, credit card number, username (e.g., for a website or account), password, temperament, mood, employer, job, hobby, likes, and/or dislikes. The computing device 802 may determine the characteristic, for example, by analyzing images of the person 804 from a camera, performing an Internet search (e.g., using the person's 804 name), searching a social media website, and/or searching a database (e.g., a public records database). Other examples of methods for determining the characteristic are further described below.

In some embodiments, the computing device 802 determines the characteristic based on data received (e.g., wirelessly) from another computing device 808 and/or electronic device (e.g., RFID tag). The other computing device 808 and/or electronic device can be associated with the other person 804. For example, the person 804 may be wearing a computing device 808 comprising a biosensor 810. The biosensor 810 may measure a heart rate, temperature, blood pressure, biorhythm, and/or other biological characteristic of the person 804. The computing device 808 may transmit this information to the computing device 802 associated with the user 806. In some embodiments, the computing device 802 may use the information as the characteristic. In other embodiments, the computing device 802 may use the information to determine a characteristic about the person 804. For example, the computing device 802 may use the information to determine the mood, temperament, or emotional state of the person 804. In one such embodiment, the computing device 802 may determine that the person 804 is angry based on, e.g., information comprising a high blood pressure. In such an embodiment, the computing device 808 may output a haptic effect configured to, for example, warn the user 806 of danger or that the person 804 is angry.

As another example, the computing device 808 may transmit a username associated with a social networking website to the computing device 802. The computing device 802 may consult the social networking website to determine traits associated with the other person 804.

In other embodiments, the computing device 802 may analyze one or more images and/or physical features associated with the person 804 to determine the characteristic. For example, the computing device 802 may capture an image of the person 804 using a camera. The computing device 802 may use the image to perform facial recognition, read a name tag associated with the person 804, and/or otherwise identify the person 804. The computing device 802 may then communicate with a server (e.g., for a social network, dating website, search engine, or personal website) to determine additional characteristics about the person 804.

In some embodiments, the computing device 808 executes another function and/or outputs a haptic effect based on the characteristic. For example, if the other person 804 has the same hobbies as the user 806, the computing device 808 may add the other person 804 as a friend on a social network. As another example, if the other person 804 is the same nationality or religion as the user 806, the computing device 808 may output a haptic effect comprising a vibration.

In some embodiments, the object comprises an animal (e.g., cat, dog, turtle, hamster, ferret, or bird). Upon a user 806 interacting with the animal, the computing device 802 may determine one or more characteristics of the animal (e.g., breed, allergen information, temperament, or mood). The computing device 802 may execute a function and/or output a haptic effect based on the characteristic. For example, the computing device 802 may read a RFID chip associated with the animal and consult a list of lost animals (e.g., on a website) to determine if the animal is lost. If so, the computing device 802 may transmit an e-mail or text message to the owner (or post a message on the website) with the GPS coordinates (or phone number) of the user 806. This may allow the animal to be reunited with the owner.

Illustrative Methods for Haptically-Enabled Interactions with Objects

Figure 9:
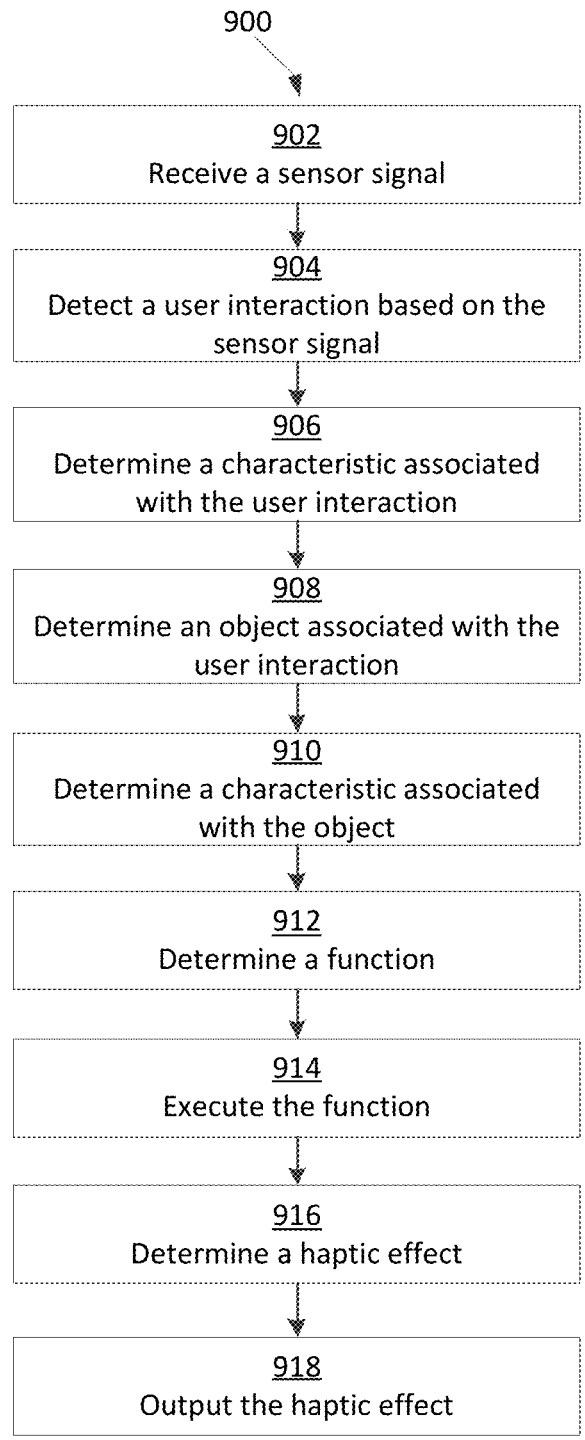
FIG. 9 is a flow chart of steps for performing a method for providing haptically-enabled interactions with objects according to another embodiment.

FIG. 9 is a flow chart of steps for performing a method for providing object manipulation with haptic feedback according to one embodiment. In some embodiments, the steps in FIG. 9 may be implemented in program code that is executed by a processor, for example, the processor in a general purpose computer, a mobile device, or a server. In some embodiments, these steps may be implemented by a group of processors. In some embodiments one or more steps shown in FIG. 9 may be omitted or performed in a different order. Similarly, in some embodiments, additional steps not shown in FIG. 9 may also be performed. The steps below are described with reference to components described above with regard to computing device 101 shown in FIG. 1.

The method 900 begins at step 902 when the processor 102 receives a sensor signal. The processor 102 may receive the sensor signal from the interaction sensor 132 and/or the additional sensors 130. The sensor signal may comprise data that is associated with a user interaction with an object. For example, in one embodiment, the data may comprise one or more images of a store shelf on which an object is sitting. In such an embodiment, the image may comprise features such as the object, the shelf, other nearby objects, and a body part of the user (e.g., a user's finger). The user's body part may be contacting or near the object.

The method 900 continues at step 904 when the processor 102 detects a user interaction based on the sensor signal. For example, the computing device 101 may be positioned within the object and the interaction sensor 132 may comprise an accelerometer. Upon the user shaking the object, the processor 102 may detect the shake via sensor signals from the accelerometer. As another example, the interaction sensor 132 may comprise a 3D imaging system oriented toward the object. Upon the user gesturing in front of the object, or along the surface of the object, the processor 102 may analyze images from the 3D imaging system. Upon analyzing the images, the processor 102 may determine that the pixels correlating to the user's hand are oriented in a particular manner associated with the user contacting or gesturing near the object.

In some embodiments, the user interaction comprises removing the object from a shelf, table, or other location on which the object is positioned. For example, the computing device 101 may be embedded in a shelf on which the object sits. An interaction sensor 132 comprising a switch or a pressure sensor may be positioned on the shelf and below the object. If the user removes the object from the shelf, the interaction sensor 132 may detect a drop in pressure or a change in the state of the switch and transmit a sensor signal to the processor 102. Based on the sensor signal, the processor 102 may determine that the user lifted the object from the shelf. In some embodiments, if the low pressure persists or the switch remains in a particular state for a predetermined period of time (e.g., 2 seconds), the processor 102 may determine that the user is holding the object.

In some embodiments, the user interaction comprises positioning the computing device 101 within a predefined distance from the object. For example, the object may transmit a wireless signal (e.g., an IEEE 802.11, Bluetooth, a NFC signal, or RFID signal) to the processor 102 (via the network interface device 110). Based on the presence or the strength of the wireless signal (e.g., if the strength exceeds a threshold), the processor 102 may determine whether the object is within the predefined distance (e.g., 3 inches) from the computing device 101. If so, the processor 102 may determine that a user interaction has occurred.

As another example, the processor 102 may receive a first set of GPS data from the interaction sensor 132. The object may also comprise GPS functionality and transmit a second set of GPS data to the computing device 101. The processor 102 may compare the first set of GPS data to the second set of GPS data and determine the relative distance between the computing device 101 and the object. If the computing device 101 is within a predetermined distance from the object, the processor 102 may determine that a user interaction has occurred.

The method 900 continues at step 906 when the processor 102 determines a characteristic associated with the user interaction. In some embodiments, the processor 102 may analyze signals from the sensor 130 and/or the interaction sensor 132 to determine a direction, orientation, pattern, pressure amount, speed, and/or other characteristic of the user interaction.

For example, in some embodiments, the computing device 101 is positioned within the object and the interaction sensor 132 may comprise a gyroscope. The processor 102 may determine that the user rotated the object (and by how much) based on orientation sensor signals from the gyroscope. As another example, in some embodiments, the interaction sensor 132 comprises a 3D imaging system oriented toward the object. The processor 102 may analyze a plurality of images from the 3D imaging system to determine the characteristics of a gesture. For instance, the processor 102 may analyze a plurality of images and determine that the user made a "Y" shape in the air with a finger. As still another example, in some embodiments, the computing device 101 is positioned within the object and the sensor 130 may comprise an accelerometer. The processor 102 may receive one or more sensor signals from the accelerometer and determine, for example, that the user is shaking the object.

The method 900 continues at step 908 when the processor 102 determines an object associated with the user interaction. In some embodiments, the object may comprise a product in a store (e.g., a box of cereal), a tool (e.g., a hammer or screw driver), a medical device (e.g., a trocar, needle, or heartbeat monitor), an automobile, a human, an animal, etc.

In some embodiments, the processor 102 may associate a user interaction with a particular object based on the proximity of the computing device 101 to the object. Examples include using GPS data and the strength of a wireless signal (e.g., as described in step 902 above) to determine whether the computing device 101 is within a predefined distance to the object. If so, the processor 102 may associate the object with the user interaction.

In some embodiments, the processor 102 associates a user interaction with a particular object based on the proximity of the user interaction to the object. For example, a user may gesture with a finger in front of an object. The interaction sensor 132 may detect the gesture and transmit a sensor signal to the processor 102. The processor 102 may analyze the sensor signal to determine the distance between the finger and the object. If the finger is within a particular distance (e.g., 6 inches) from the object, the processor 102 may associate the gesture with the object.

In some embodiments, the processor 102 associates a user interaction with a particular object based on a direction or orientation of the user interaction. For example, a user may point at an object the user is interested in purchasing. The interaction sensor 132 may detect the gesture and transmit a sensor signal to the processor 102. The processor 102 may analyze the sensor signal and determine that the point gesture is directed toward the object. Based on the direction of the gesture, the processor 102 may associate the object with the point interaction.

In some embodiments, the processor 102 associates a user interaction with a particular object by comparing sensor data from the object to sensor data from the computing device 101. For example, a user may wear a wristband comprising the computing device 101. The user may pick up and shake an object. The processor 102 may receive a first set of accelerometer data associated with the shake from an interaction sensor 132 within the wristband. The processor 102 may also receive a second set of accelerometer data from an accelerometer within the packaging of the object or the object itself (e.g., the object may wirelessly communicate the accelerometer data to the computing device 101). The processor 102 may compare the two sets of accelerometer data. For example, the processor 102 may compare the time stamps of peaks in the two sets of accelerometer data. If the time difference between the two time stamps is below a threshold (e.g., 0.5 s), the processor 102 may determine that the shake was with respect to that particular object.

As another example, a user may pick up an object off a shelf. The shelf may comprise a computing device 101 configured detect the object's removal and transmit (e.g., wirelessly) a time stamp associated with when the object was removed from the shelf. The processor 102 may receive the time stamp and compare the time stamp with a time stamp associated with data (e.g., an image) from interaction sensor 132. If the time difference between the two time stamps is below a threshold, the processor 102 may determine that the user picked up that particular object.

The method 900 continues at step 910 when the processor 102 determines a characteristic associated with the object. In some embodiments, the processor 102 may rely on programming in the object interaction detection module 124 to determine the characteristic. In some embodiments, the processor 102 determines a characteristic associated with the object based on the characteristic associated with the user interaction. For example, the processor 102 may determine different characteristics associated with an object in response to different user interactions. For example, the processor 102 may determine the manufacturer on the label of a food product when the user the user taps the food product. The processor 102 may determine the color of a food product when the user moves a finger along the surface of the food product in a "C" shape.

In some embodiments, processor 102 determines a characteristic associated with the object based on a wired or wireless signal (e.g., from another computing device 101). For example, the object may comprise a computing device 101 or the shelf may comprise a computing device 101. The object or the shelf may transmit information about the object which can be received by the processor 102. The information may include, for example, an identifier (e.g., a name, QR code, bar code, QR code, RFID code, or unique identifier), classification (e.g., the type of product, manufacturer, producer, or brand), price, discount, coupon, or function (e.g., what the product does or may be used for) associated with the object. For example, if the object is a shampoo bottle, the information may comprise exactly which bottle of shampoo it is (e.g., number 3 on the shelf), what kind of product it is (e.g., shampoo), what specific product it is (e.g., Hair Company's shampoo for fine hair, or a barcode), or what brand of product it is (e.g., Hair Company brand).

In some embodiments, the processor 102 determines the characteristic using the Internet or a LAN. The processor 102 may communicate with one or more servers, databases, and/or webpages via the Internet or a LAN to determine the characteristic. For example, the processor 102 query multiple databases over the Internet (e.g., using the object's bar code) to determine the number of stores proximate to the user (e.g., within 10 miles) that sell the object. The processor 102 may also determine which store has the cheapest price.

The method 900 continues at step 912 when the processor 102 determines a function. In some embodiments, the processor 102 may rely on programming in the function determination module 125 to determine the characteristic.

In some embodiments, the processor 102 determines a function based on the user interaction. For example, the processor 102 may determine different functions in response to different user interactions. For instance, upon the user tapping on a poster of a band, the processor 102 may determine a function comprising downloading a MP3 associated with the band. The processor 102 may determine a function comprising retrieving the lyrics to a popular song when the user swipes a finger along the surface of the music poster.

In some embodiments, processor 102 determines a function based on a characteristic of the object. For example, the processor 102 may determine a function based on the type of the object. For instance, in one embodiment, upon a user tapping on a book, the processor 102 may determine a function comprising adding the book to a reading list. In another embodiment, upon the user tapping on a battery, the processor 102 may determine a function comprising ordering a new battery.

In some embodiments, the computing device 101 may store associated "function profiles" in which a user can determine and save in memory 104 a "profile" of the functions the user would like associated with particular objects and/or user interactions. For example, in one embodiment, a user can select from a list of options which function the user would like associated with the tapping on a document, swiping a finger along a surface of the document, and rotating the document. In some embodiments, the list may comprise, for example, downloading an electronic copy of the document, printing the document, and e-mailing an electronic copy of the document. In such an embodiment, the processor 102 may consult with the user's function profile to determine a function. For example, if the user's function profile associates tapping on the document with downloading an electronic copy of the document, in response to the user tapping on the document, the processor 102 may determine a function comprising downloading the electronic copy of the document.

In some embodiments, the processor 102 determines the function using the Internet or a LAN. The processor 102 may communicate with one or more servers, databases, other computing devices (e.g., within the object, the object's packaging, a shelf, or a store), and/or webpages via the Internet or a LAN to determine the function. For example, the processor 102 may query a server over the Internet (e.g., using the object's bar code) to determine which functions are available and/or associated with a particular object. The server may transmit a list of available functions for the particular object to the computing device 101. The computing device 101 may determine a function based on the list of available functions.

As another example, the computing device 101 may receive data (e.g., from a server) that maps user interactions to functions for a particular object. For example, the computing device 101 may receive data that maps, for a particular object, a swipe gesture to a function comprising purchasing the object. Upon the computing device 101 detecting a user interaction, the computing device 101 may determine the corresponding function based on the data. This may allow multiple users interacting with the particular object to have a consistent experience, because each computing device 101 will execute similar functions based on similar user interactions.

As still another example, the processor 102 may determine a function based on a characteristic of the object received via a wired or wireless signal (e.g., from another computing device 101). For example, a shelf computing device may transmit information about the object, which can be received by the processor 102. The information may include, for example, an identifier (e.g., a name, QR code, bar code, QR code, RFID code, or unique identifier), classification (e.g., the type of product, manufacturer, producer, or brand), price, discount, coupon, or function (e.g., what the product does or may be used for) associated with the object. For example, if the object is a shampoo bottle, the information may comprise exactly which bottle of shampoo it is (e.g., number 3 on the shelf), what kind of product it is (e.g., shampoo), what specific product it is (e.g., Hair Company's shampoo for fine hair, or a barcode), or what brand of product it is (e.g., Hair Company brand). Based on the characteristic, the processor 102 may determine one or more functions.

The method 900 continues at step 914 when the processor 102 executes the function. In some embodiments, the processor 102 may execute the function by executing one or more sub-functions. For example, if the function comprises purchasing an object via the Internet for the cheapest available price, the processor 102 may communicate with multiple servers (e.g., a search engine and one or more websites) to determine all of the stores through which the object can be purchased online. The processor 102 may also determine which of the stores has the cheapest price. The processor 102 may further purchase the object from the store with the cheapest price (e.g., via the store's website or another server).

The method 900 continues at step 916 when the processor 102 determines a haptic effect. In some embodiments, the processor 102 may determine a haptic effect associated with the function. For example, the processor 102 may determine a haptic effect associated with a type of the function. For instance, in one embodiment, the processor 102 may determine a haptic effect comprising a short vibration if the function comprises adding an entry to a list. In such an embodiment, the processor 102 may determine a haptic effect comprising three short vibrations if the function comprises removing an entry from a list. This may indicate to the user which function was performed (or will be performed in the future).

In some embodiments, the processor 102 determines a haptic effect configured to indicate that the function has been executed. For example, the processor 102 may determine a haptic effect comprising a stroking sensation once the function has executed. This may indicate to the user that the function was performed. In some embodiments, the processor 102 may determine different haptic effects based on the result of executing the function. For example, the processor 102 may output a different haptic effect if the function was successfully executed than if the function was not successfully executed.

In some embodiments, the processor 102 determines a haptic effect configured to indicate whether an object can be manipulated to input data and/or execute a specific function. For instance, the processor 102 may detect a user picking up an object and output a haptic effect (e.g., a vibration) if, for example, the object can be purchased by performing a gesture with the object (e.g., shaking the object). The processor 102 may not output a haptic effect if the object cannot be purchased by performing a gesture with the object. Thus, in some embodiments, the haptic effect may indicate to the user whether the object can be manipulated to perform a specific task.

In some embodiments, the processor 102 determines a haptic effect associated with the progress of a function being executed. For example, the processor 102 may determine a haptic effect comprising a pulsed vibration with a frequency and/or period associated with the progress of a download or the playback of a media file. This may indicate to the user how much time is left until the function is done executing or the media file is done playing. In some embodiments, the processor 102 determines a haptic effect associated with the cancellation of a function (e.g., prior to being executed or while the function is being executed). For example, the processor 102 may determine a haptic effect comprising a stinging sensation if the user cancels the execution of a function prior to (or during) the execution of the function.

In some embodiments, the processor 102 determines a haptic effect configured to indicate that the computing device 101 is awaiting additional user input and/or a status of the function. For example, the computing device 101 may detect an interaction with an object. Based on the interaction, the computing device 101 may determine a function comprising purchasing the object. The computing device 101 may enter all the user's details into a purchase form and wait for the user to provide confirmation to finalize the purchase. The computing device 101 may output a haptic effect (e.g., a vibration) configured to alert the user that the computing device 101 is waiting for the user's confirmation. Upon the user performing another interaction with the object (e.g., rotating the object 90 degrees), the computing device 101 may finalize the purchase. Once the purchase is complete, the computing device 101 may output another haptic effect, e.g., to indicate that the purchase is complete.

In some embodiments, the processor 102 determines a haptic effect based on a characteristic associated with the user interaction. For example, the processor 102 may determine the haptic effect based the type, location, duration, or other characteristics of the user interaction. For instance, the processor 102 may determine a haptic effect comprising a vibration if the user contacts a specific portion of a product, such as the nutritional label. As another example, the processor 102 may determine a haptic effect if the user interaction comprises a swipe along a surface of the object, and no haptic effect if the user interaction comprises tapping on the object.

In some embodiments, the computing device 101 may store associated "haptic profiles" in which a user can determine and save in memory 104 a "profile" of the haptic effects the user would like associated with particular functions and/or user interactions. For example, in one embodiment, a user can select from a list of options which haptic effect the user would like associated with functions such as determining the price of an object, printing a document associated with an object, opening a website associated with an object, or determining a material of an object. In some embodiments, the list may comprise, for example, haptic effects such as low magnitude vibration, pulsed vibration, high-magnitude vibration, or a simulated texture. In some embodiments, the processor 102 may consult with the user's haptic profile to determine which haptic effect to generate. For example, if the user's haptic profile associates locally produced products with a haptic effect comprising a low-frequency vibration, in response to the user contacting a locally made chocolate bar, the processor 102 may determine a haptic effect comprising a low-frequency vibration.

In some embodiments, the processor 102 may determine a default haptic effect. For example, if the processor 102 is unable to perform a function (e.g., unable to execute an application, purchase a product, or download a file), the processor 102 may determine a haptic effect comprising a vibration. This may alert the user that the operation could not be performed.

For example, the computing device 101 may be configured to output a jolt if the user interacts with a product that is too expensive (e.g., the price is above a threshold). The computing device 101 may be configured to output no haptic effect if the user interacts with a product that is not too expensive. In such an embodiment, if the processor 102 cannot determine the price of the product (e.g., because it cannot connect to the Internet), the processor 102 may determine a haptic effect comprising three pulsed vibrations. Thus, rather than the computing device 101 outputting no haptic effect, which could falsely lead the user to believe the product is not too expensive, the three pulsed vibrations can alert the user that the processor 102 was unable to determine the price. The user can then read the price tag or otherwise determine whether the product is too expensive.

In some embodiments, the processor 102 determines a haptic effect based on a characteristic of the user. For example, if the processor 102 determines that the user is a male, the processor 102 may determine a different haptic effect than if the processor 102 determines that the user is a female. As another example, the processor 102 may determine a haptic effect if the user is under 40 years old than if the user is over 40 years old. In this manner, haptic effects can be customized for different demographics, which may improve a user's response to the haptic effect.

In some embodiments, the processor 102 determines a plurality of haptic effects. Each of the plurality of haptic effects may be associated with a different function. For example, the processor 102 may determine a haptic effect associated with a determining whether the size of the object is below a threshold (e.g., a long vibration). The processor 102 may also determine a haptic effect associated with adding the object to a shopping list. Based on the plurality of haptic effects, the user may be able to determine that multiple different functions have been executed (e.g., that the size of the object was determined and that the object has been added to a shopping list), for example, without having to measure the object or interact with a touchscreen user interface (which may be tedious and time consuming).

In some embodiments, the processor 102 determines that a specific haptic effect has a higher priority than another haptic effect, and thus to output only the high priority effect. For example, in the above size and shopping list example, the processor 102 may determine that the haptic effect associated with the size has a higher priority than other effects (e.g., the haptic effect associated with adding the object to a shopping list), and thus output only the size haptic effect. Alternatively, the processor 102 may determine that only the most intense effect should be output. Thus, in some embodiments, the processor may determine a low intensity vibration and a high intensity vibration, but output only the high intensity vibration.

In some embodiments, the processor 102 may determine a haptic effect configured to make it easier or harder to interact with the object. For example, the object may be positioned on a shelf. Upon a user interacting with the object, the processor 102 may determine that the object comprises a drug harmful to the user. Based on the harmful drug, the processor 102 may transmit a signal to a packaging computing device. The packaging computing device may receive the signal and output a haptic effect configured to lower the perceived coefficient of friction on the surface of the object's packaging. This may make it challenging for the user to grip or grasp the object to pick it up. Further, in some embodiments, the object (e.g., packaging of the object) may have a metal bottom. Based on the harmful drug, the processor 102 may transmit a signal to a shelf computing device. The shelf computing device may receive the signal and actuate an electromagnetic device configured to apply a strong magnetic field to the metal bottom of the object. This may make it challenging for the user to lift the object off the shelf (e.g., to purchase it).

As another example, the object's packaging may be deformed around another object, such as a shelf (e.g., to secure the object to the shelf). For instance, the shelf may comprise a bar around which the packaging (or object) is bent to secure the object to the bar. In some embodiments, upon the user interacting with the object, the processor 102 may transmit data (e.g., a purchase receipt code, name, credit card number, or customer identifier) to a packaging computing device positioned in the object's packaging. The data may indicate that the user already purchased the item (e.g. online), or may otherwise be associated with a purchase of the product (e.g., the data may include a credit card number which the object may use to conduct the purchase in real time). Based on the data, in some embodiments, the packaging computing device may output a haptic effect configured to deform the shape of the packaging. For example, the packaging computing device may output a haptic effect configured to unbend the packaging from around the bar (e.g., to de-secure the object from the shelf). This may allow the user to take the object.

The method 900 continues at step 918 when the processor 102 outputs the haptic effect. The processor 102 may transmit a haptic signal associated with the haptic effect to haptic output device 118, which outputs the haptic effect. The haptic effect may comprise a texture (e.g., sandy, bumpy, or smooth), a vibration, a change in a perceived coefficient of friction, a change in temperature, a stroking sensation, an electro-tactile effect, or a deformation (i.e., a deformation of a surface associated with the computing device 101).

Additionally or alternatively, in some embodiments, the computing device 101 may output a sound and/or information on a display. The sound and/or information may be associated with a characteristic of the object and/or a function. For example, the user may tap on a toy. The computing device 101 may determine the name of the toy and, based on the name, whether to execute a function comprising outputting the name of the toy on the display. The computing device 101 may also determine if the toy is on a birthday list (e.g., made by the user's friends). If so, the computing device 101 may execute a function comprising outputting a sound. The sound may comprise a beep. This may notify the user that the user has interacted with an item on the birthday list.

Advantages of Haptically-Enabled Interactions with Objects

There are numerous advantages to haptically-enabled interactions with objects. Such systems may provide information about an object quickly and efficiently. For example, a user can tap on an object and substantially simultaneously receive information about the price of an object (e.g., via haptic effects). This may be quicker and easier than, for example, looking up such information using a mobile device or consulting with a store employee.

In some embodiments, haptically-enabled interactions with objects can allow a user to execute one or more functions (e.g., digital operations) quickly and easily. For example, a computing device may detect a user interaction with a laptop computer (e.g., a user drawing an "A" with a finger along the surface of the laptop computer's monitor). Based on the user interaction, the computing device may transmit one or more signals to the laptop computer configured to cause the laptop computer to perform a hardware analysis. The computing device may receive data from the laptop computer associated with any failed hardware components determined from the hardware analysis. The computing device may further order one or more of the failed hardware components via the Internet. Thus, the computing device can quickly and easily perform a plurality of digital operations that may be cumbersome for a user.

In some embodiments, haptically-enabled interactions with objects can allow a user to determine a status of one or more functions and/or the computing device. For example, a user may want to download a copy of a song playing on the radio. While the song is playing, the user may tap on a MP3 player twice. The computing device may detect the two taps, begin recording audio via a microphone, and analyze the audio to identify the song. If the computing device cannot identify the song, the computing device may output a buzz sensation, e.g., to indicate to the user that the computing device cannot download the song. If the computing device can identify the song, the computing device may output a high-frequency vibration, e.g., to indicate to the user that the computing device has successfully identified the song. Thereafter, in some embodiments, the computing device may wait to receive another gesture to confirm the download. The computing device may output three short vibrations indicating that the computing device is waiting for additional user input. The computing device may detect a third tap by the user and download the MP3 from a server. Upon the download finishing, the computing device may output a jolt sensation, e.g., to indicate to the user that the download is complete.

General Considerations

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, in which other rules may take precedence over or otherwise modify the application of the invention. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may comprise computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A computing device comprising:
   a processor; and
   a memory device comprising instructions executable by the processor to cause the processor to:
   detect an interaction associated with a physical object that is separate from the computing device using one or more sensors, wherein the interaction includes a gesture or a contact;
   determine a characteristic of the physical object by communicating via a network with a remote device that is different from the physical object, wherein the remote device is configured to provide information about the physical object to the processor;
   determine a haptic effect based on the characteristic of the physical object; and
   transmit a haptic signal configured to cause a haptic output device to output the haptic effect.

2. The computing device of claim 1, wherein the interaction is a user interaction with the physical object itself.

3. The computing device of claim 2, wherein the user interaction includes a user contacting the physical object.

4. The computing device of claim 1, wherein the physical object is a product for sale, and wherein the interaction is a user interaction with packaging for the product.

5. The computing device of claim 4, wherein the user interaction includes a user contacting the packaging.

6. The computing device of claim 1, wherein the interaction includes a user gesture, the user gesture being a predetermined movement oriented toward the physical object and distant from the physical object.

7. The computing device of claim 1, wherein the interaction involves moving the physical object.

8. The computing device of claim 7, wherein the interaction involves positioning the physical object in a carrying device.

9. The computing device of claim 1, wherein the computing device is part of a wearable device.

10. The computing device of claim 9, wherein the wearable device is a ring, watch, or wristband.

11. The computing device of claim 1, wherein the network comprises a local area network (LAN) associated with a store in which the physical object is for sale.

12. The computing device of claim 1, wherein the network comprises an Internet, and the remote device is a server.

13. The computing device of claim 1, wherein the information about the physical object includes a price, size, weight, depth, color, texture, shape, discount, product rating, expiration date, functional attribute, quantity, usage restriction, warranty, brand, manufacturer, producer, production location, electrical characteristic, noise attribute, speed attribute, material, compatibility attribute, or nutritional attribute, corresponding to the physical object.

14. A method comprising:
   detecting, by a processor of a computing device, an interaction associated with a physical object that is separate from the computing device using one or more sensors, wherein the interaction includes a gesture or a contact;
   determining, by the processor, a characteristic of the physical object by communicating via a network with a remote device that is different from the physical object, wherein the remote device is configured to provide information about the physical object to the processor;
   determining, by the processor, a haptic effect based on the characteristic of the physical object; and
   transmitting, by the processor, a haptic signal configured to cause a haptic output device to output the haptic effect.

15. The method of claim 14, wherein the interaction is a user interaction with the physical object itself.

16. The method of claim 15, wherein the user interaction includes a user contacting the physical object.

17. The method of claim 14, wherein the physical object is a product for sale, and wherein the interaction is a user interaction with packaging for the product.

18. The method of claim 17, wherein the user interaction includes a user contacting the packaging.

19. The method of claim 14, wherein the interaction includes a user gesture, the user gesture being a predetermined movement oriented toward the physical object and distant from the physical object.

20. The method of claim 14, wherein the interaction involves moving the physical object.

21. The method of claim 20, wherein the interaction involves positioning the physical object on or inside a carrying device.

22. The method of claim 14, wherein the computing device is part of a wearable device.

23. The method of claim 22, wherein the wearable device is a ring, watch, or wristband.

24. The method of claim 14, wherein the network comprises a local area network (LAN) associated with a store in which the physical object is for sale.

25. The method of claim 14, wherein the network comprises an Internet, and the remote device is a server.

26. The method of claim 14, wherein the information about the physical object includes a price, size, weight, depth, color, texture, shape, discount, product rating, expiration date, functional attribute, quantity, usage restriction, warranty, brand, manufacturer, producer, production location, electrical characteristic, noise attribute, speed attribute, material, compatibility attribute, or nutritional attribute, corresponding to the physical object.

27. A non-transitory computer-readable medium comprising program code that is executable by a processor of a computing device to cause the processor to:
  detect an interaction associated with a physical object that is separate from the computing device using one or more sensors, wherein the interaction includes a gesture or a contact;
  determine a characteristic of the physical object by communicating via a network with a remote device that is different from the physical object, wherein the remote device is configured to provide information about the physical object to the processor;
  determine a haptic effect based on the characteristic of the physical object; and
transmit a haptic signal configured to cause a haptic output device to output the haptic effect.

* * * * *